United States Patent
Haseyama et al.

(10) Patent No.: US 6,849,667 B2
(45) Date of Patent: Feb. 1, 2005

(54) FOAM OF THERMOPLASTIC URETHANE ELASTOMER COMPOSITION AND PROCESS FOR PRODUCING THE FOAM

(75) Inventors: Ryuuji Haseyama, Sodegaura (JP); Masahiko Hashiba, Sodegaura (JP); Kaoru Yorita, Sodegaura (JP); Shigeo Nishikawa, Sodegaura (JP); Yoko Shimada, Kodaira (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/148,998

(22) PCT Filed: Oct. 11, 2001

(86) PCT No.: PCT/JP01/08942

§ 371 (c)(1),
(2), (4) Date: Jun. 6, 2002

(87) PCT Pub. No.: WO02/32986

PCT Pub. Date: Apr. 25, 2002

(65) Prior Publication Data

US 2002/0193459 A1 Dec. 19, 2002

(30) Foreign Application Priority Data

Oct. 18, 2000 (JP) ....................................... 2000-318307

(51) Int. Cl.$^7$ .............................................. C08G 18/28
(52) U.S. Cl. ....................... 521/170; 521/130; 521/131; 521/174
(58) Field of Search ................................. 521/130, 131, 521/170, 174

(56) References Cited

U.S. PATENT DOCUMENTS 6,348,514 B1 * 2/2002 Calabrese et al. .......... 521/130

FOREIGN PATENT DOCUMENTS

| EP | 0 610 953 A1 | 8/1994 |
| EP | 1 186 392 A1 | 3/2002 |
| JP | 7-157588 | 6/1995 |
| JP | 08-011190 | 1/1996 |
| JP | 8-157635 A | 6/1996 |

\* cited by examiner

Primary Examiner—John M. Cooney, Jr.
(74) Attorney, Agent, or Firm—Birch, Stewart, Kolasch & Birch, LLP

(57) ABSTRACT

The method of the present invention for producing a urethane-based thermoplastic elastomer composition foam comprises the steps of:

adding and mixing 0.1 to 30 parts by weight of carbon dioxide (B) to 100 parts by weight of a urethane-based thermoplastic elastomer composition (A) in a molten state, wherein said urethane-based thermoplastic elastomer composition (A) comprises a urethane-based thermoplastic elastomer (A-1) and other thermoplastic elastomer (A-2) in an (A-1)/(A-2) ratio of 20/80 to 99/1 by weight, to form a molten urethane-based thermoplastic elastomer composition (C) which is in a state of a mixture of the urethane-based thermoplastic elastomer composition (A) and the carbon dioxide (B) (gas dissolving step); and lowering a temperature of said molten urethane-based thermoplastic elastomer composition (C) (cooling step).

The present invention can produce the urethane-based thermoplastic elastomer foam of stable quality over a range from low foamed product to highly foamed product by adding a given quantity of carbon dioxide in the molten urethane-based thermoplastic elastomer quantitatively and stably. It can also produce the foam excellent in flexibility, thermal insulation and surface appearances. It is also excellent in safety, because of use of carbon dioxide in place of the common foaming agent of fluorochlorohydrocarbon or butane, thus causing no air pollution or destruction of the ozone layer.

16 Claims, 7 Drawing Sheets

FOAM OF THERMOPLASTIC URETHANE ELASTOMER COMPOSITION AND PROCESS FOR PRODUCING THE FOAM

This application is the national phase under 35 U.S.C. § 371 of PCT International Application No. PCT/JP01/08942 which has an International filing date of Oct. 11, 2001, which designated the United States of America.

TECHNICAL FIELD

This invention relates to a urethane-based thermoplastic elastomer composition foam, method for producing the same, and molded article or laminate thereof, more particularly a urethane-based thermoplastic elastomer composition foam of stable quality obtained from a specific urethane-based thermoplastic elastomer, optionally another thermoplastic elastomer, and carbon dioxide as a foaming agent, method for producing the same, and molded article or laminate thereof.

BACKGROUND ART

Foams composed of polyurethane, polyvinyl chloride or the like have been used as a foam excellent in its flexibility and cushioning characteristics, and foams composed of polystyrene, polyethylene, polypropylene or the like have been used as a foam excellent in its thermoformability.

Methods for producing polyethylene foams are disclosed in, e.g., Japanese Patent Publication No. 41-6278. There is, however, a problem that the foam produced by this method does not provide soft cushioning characteristics, although it is excellent in thermoformability such as vacuum molding.

As a method of producing thermoplastic polyurethane foams, a chemical foaming method using a thermally decomposable foaming agent, such as azodicarbon amide, is known which is disclosed in Japanese Patent Laid-Open No. 7-157588.

In the chemical foaming method, however, thermoplastic polyurethane is partly decomposed and foamed to deteriorate the cells, and it is difficult to produce foams with a high molecular weight.

Therefore, foams excellent in all of elongation set, hysteresis, cell uniformity and heat resistance are desired. Simple methods of producing such foams, and molded articles and laminates thereof are also demanded.

It is an object of the present invention to provide a foam excellent in elongation set, hysteresis, cell uniformity and heat resistance, more particularly a foam obtained from a composition containing a thermoplastic polyurethane (including a composition composed of a 100% thermoplastic polyurethane, hereinafter referred to as a thermoplastic polyurethane composition, unless otherwise stated). It is another object of the present invention to provide a method for producing the above-described foam. It is still another object of the present invention to provide a molded article or laminate of the above-described foam.

The present invention also provides a method of easily foaming the thermoplastic polyurethane composition.

DISCLOSURE OF THE INVENTION

The inventors of the present invention have found, after having studied to solve the above problems, a foam obtained from a thehermoplastic polyurethane composition, excellent in elongation set, hysteresis, cell uniformity and heat resistance. The inventors have also found that thermoplastic polyurethane foams of varying expansion ratio can be obtained with ease, when a urethane-based thermoplastic elastomer composition composed of a specific urethane-based thermoplastic elastomer and other thermoplastic elastomer mixed in an arbitrary composition ratio is foamed with carbon dioxide as a foaming agent.

The present invention is as follows.

A urethane-based thermoplastic elastomer composition foam of the present invention comprises thermoplastic polyurethane resin-containing composition containing a thermoplastic polyurethane resin at 20% by weight or more, wherein the form has an average cell diameter of 0.1 to 1,000 $\mu$m, an average cell number of $10^3$ to $10^{16}$/cm$^3$, an elongation set of 1 to 100%, and a bulk density of 0.03 to 1.10 g/cm$^3$.

It is preferable that a melting point of the urethane-based thermoplastic elastomer composition foam ($T_{m1}$) and the non-foamed resin ($T_{m2}$) satisfies the following formula (1):

$$T_{m1}-T_{m2} \geq 5° \text{ C.} \tag{1}$$

It is also preferable that the chloroform-insolubles is contained at 10% by weight or more in the urethane-based thermoplastic elastomer composition foam.

It is still also preferable that a residue after chloroform extraction of the urethane-based thermoplastic elastomer composition foam is at 20% by weight or more, and a temperature in losing 5 % by weight of the residue after chloroform extraction is 180° C. or higher.

The first method for producing a urethane-based thermoplastic elastomer composition foam comprises the steps of:

adding and mixing 0.1 to 30 parts by weight of carbon dioxide (B) to 100 parts by weight of a urethane-based thermoplastic elastomer composition (A) in a molten state, wherein said urethane-based thermoplastic elastomer composition (A) comprises a urethane-based thermoplastic elastomer (A-1) and other thermoplastic elastomer (A-2) in an (A-1)/(A-2) ratio of 20/80 to 99/1 by weight, to form a molten urethane-based thermoplastic elastomer composition (C) which is in a state of a mixture of the urethane-based thermoplastic elastomer composition (A) and the carbon dioxide (B) (gas dissolving step); and lowering a temperature of said molten urethane-based thermoplastic elastomer composition (C) (cooling step).

The second method for producing a urethane-based thermoplastic elastomer composition foam comprises the steps of:

adding and mixing 0.1 to 30 parts by weight of carbon dioxide (B) to 100 parts by weight of a urethane-based thermoplastic elastomer composition (A) in a molten state to form a molten urethane-based thermoplastic elastomer composition (C) which is in a state of a mixture of the urethane-based thermoplastic elastomer composition (A) and the carbon dioxide (B) (gas dissolving step); and charging or transferring the molten urethane-based thermoplastic elastomer composition (C), which is obtained through the cooling step (the step of lowering a temperature of the molten urethane-based thermoplastic elastomer composition (C)) in or to a space controlled at a lower pressure than that of in the cooling step to produce cell nuclei in the molten urethane-based thermoplastic elastomer composition (C), and then foaming while controlling an expansion ratio (foaming controlling step).

It is preferable that the method for producing a urethane-based thermoplastic elastomer composition (A) has a melt flow rate (determined in accordance with ASTM D-1238-65T) of 0.5 to 50 g/10 minutes.

It is also preferable that the urethane-based thermoplastic elastomer composition (A) comprises the urethane-based thermoplastic elastomer (A-1) and the other thermoplastic elastomer (A-2) having a melt flow rate (determined in accordance with ASTM D-1238-65T) of 0.01 g/10 minutes or more and less than 50 g/10 minutes, said other thermoplastic elastomer (A-2) being contained in 5 to 60 parts by weight per 100 parts by weight of said urethane-based thermoplastic elastomer composition (A).

It is preferable that a temperature of the molten urethane-based thermoplastic elastomer composition in the gas dissolving step is in the range of 100 to 240° C. and a temperature of said molten urethane-based thermoplastic elastomer composition in the cooling step is 10 to 100° C. lower than that in the gas dissolving step.

It is preferable that an amount of the carbon dioxide (B) added is in the range of 0.1 to 20 parts by weight per 100 parts by weight of said urethane-based thermoplastic elastomer composition (A).

It is preferable that the carbon dioxide (B) is a supercritical carbon dioxide (B-1).

It is preferable that a method for adding carbon dioxide in the gas dissolving step is the one that carbon dioxide in a liquified form is added to a pump or like to charge while keeping in a liquified form, and under the charging pressure of carbon dioxide by the pump being kept in a constant pressure of critical pressure of carbon dioxide (7.4 MPa) to 40 Mpa, the carbon dioxide is charged by the pump, and the carbon dioxide charged from the pump is heated to a critical temperature of carbon dioxide (31° C.) or higher, to be a supercritical carbon dioxide, and then the supercritical carbon dioxide is added to said urethane-based thermoplastic elastomer compound of a molten state.

It is preferable that the urethane-based thermoplastic elastomer (A-1) is selected from the group consisting of an amorphous polymer, semi-crystalline polymer, liquid-crystalline polymer, thermoplastic polymer and elastomer, each containing at least one kind of bond selected from the group consisting of urethane bond, urea bond, thiourethane bond and thiourea bond.

A urethane-based thermoplastic elastomer composition foam of the present invention has:
an average cell diameter of 0.1 to 1,000 $\mu$m,
an average cell number of $10^3$ to $10^6$/cm$^3$,
an elongation set of 1 to 100%, and
a bulk density of 0.03 to 1.10 g/cm$^3$,
and is obtainable through steps that; a gas dissolving step in which 0.1 to 30 parts by weight of carbon dioxide (B) is added to 100 parts by weight of a urethane-based thermoplastic elastomer composition (A) of a molten state, wherein said urethane-based thermoplastic elastomer composition (A) comprises a urethane-based thermoplastic elastomer (A-1) and other thermoplastic elastomer (A-2) in an (A-1)/(A-2) ratio of 20/80 to 99/1 by weight to form a molten urethane-based thermoplastic elastomer composition (C) which is in a state of a mixture of the urethane-based thermoplastic elastomer composition (A) and the carbon dioxide (B); and a cooling step in which a temperature of the molten urethane-based thermoplastic elastomer composition (C) is lowered.

A urethane-based thermoplastic elastomer composition foam of the present invention has:
an average cell diameter of 0.1 to 1,000 $\mu$m,
an average cell number of $10^3$ to $10^{16}$/cm$^3$,
an elongation set of 1 to 100%, and
a bulk density of 0.03 to 1.10 g/cm$^3$.
and is obtainable through steps that:
a gas dissolving step in which 0.1 to 30 parts by weight of carbon dioxide (B) is added to 100 parts by weight of a urethane-based thermoplastic elastomer composition (A) of a molten state to form a molten urethane-based thermoplastic elastomer composition (C) which is in a state of a mixture of urethane-based thermoplastic elastomer composition (A) and the carbon dioxide (B);
a cooling step in which a temperature of said molten urethane-based thermoplastic elastomer composition (C) is lowered; and
a foaming controlling step in which said molten urethane-based thermoplastic elastomer composition (C) obtained through the gas dissolving step and the cooling step, is charged in or transferred to a space controlled at a lower pressure than that of the cooling step to produce cell nuclei in said molten urethane-based thermoplastic elastomer composition (C), and foamed while controlling an expansion ratio.

A laminate of the present invention includes the urethane-based thermoplastic elastomer composition foam.

A molded article of the present invention comprises the urethane-based thermoplastic elastomer composition foam.

The present invention provides a high-quality polyurethane-based foam having fine bubbles of uniform size distributed uniformly throughout the foam, excellent in surface conditions and outer appearances, and also excellent in flexibility and mechanical properties. Particularly, use of carbon dioxide allows for forming the composition smoothly in high productivity without the use of a fluorochlorohydrocarbon and organic solvent, and hence is desirable in terms of environmental considerations and safety.

Moreover, the present invention, using a thermoplastic resin (e.g., TPU) as the starting material, provides a urethane-based thermoplastic resin material excellent in recyclability and low in environmental burden.

The molded article or the like made of the foam of the urethane-based thermoplastic elastomer composition of the present invention is excellent in lightness, flexibility, thermal insulation and surface appearances, and can be suitably used for various areas, e.g., interiors for automobiles, other vehicles and ships, cushioning materials, insulators, and interiors for constructed structures, e.g., houses. The foam of the polyurethane-based thermoplastic elastomer composition of the present invention can also be suitably used for laminates.

Figure 1:
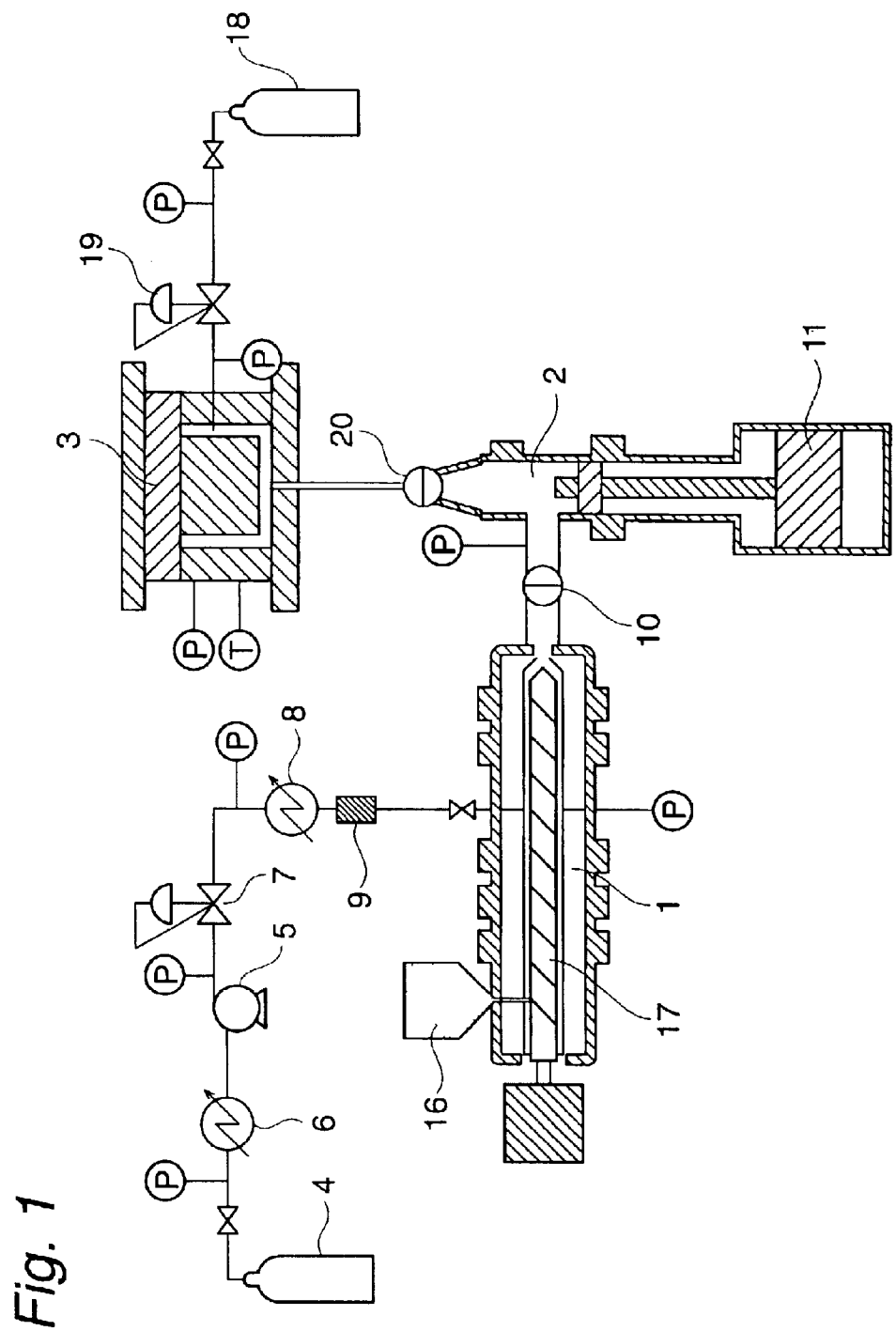
FIG. 1 schematically shows the structure of one example of the method of the present invention for producing a urethane-based thermoplastic elastomer foam.

Reference numerals shown in FIGS. (1) to (31) denote the following items.

Description of Symbols (1) Resin plasticizing cylinder
(2) Injector
(3) Mold
(4) Liquefied carbon dioxide cylinder
(5) Metering pump
(6) Refrigerant circulator
(7) Pressure regulator
(8) Heater
(9) Flow meter
(10) On-off valve
(11) Injection plunger
(12) Adaptor
(13) Resin accumulator plunger
(14) Resin accumulator
(15) In-line screw type injection molder
(16) Hopper
(17) Screw
(18) Gas cylinder
(19) Pressure control valve
(20) On-off valve
(21) First extruder
(22) Second extruder
(23) Connection
(24) Die
(25) Foam
(26) Hopper
(27) Screw
(28) Cooler
(29) Circular die
(30) Foamed sheet
(31) Water-cooled mandrel Best Mode of Carrying Out the Invention The urethane-based thermoplastic elastomer composition foam of the present invention comprises a composition containing a thermoplastic polyurethane resin (hereinafter sometimes referred to as "a thermoplastic polyurethane resin-containing composition") containing the thermoplastic polyurethane resin at 20% by weight or more, wherein the foam has an average cell diameter of 0.1 to 1,000 $\mu$m,
an average cell number of $10^3$ to $10^{16}$/cm$^3$,
an elongation set of 1 to 100%, and
a bulk density of 0.03 to 1.10 g/cm$^3$.

The foam is obtained by, e.g., foaming a thermoplastic polyurethane resin, optionally added and molten with another thermoplastic resin or the like, and mixed with a supercritical carbon dioxide gas.

First, the foam will be described.

Foam Obtained from a Composition Containing a Thermoplastic Polyurethane Resin

The urethane-based thermoplastic elastomer composition foam of the present invention (hereinafter sometimes referred to as "foam") is the foam comprising a thermoplastic polyurethane resin-containing composition which contains a thermoplastic polyurethane resin at 20% by weight or more, wherein the foam has an average cell diameter of 0.1 to 1,000 $\mu$m,
an average cell number of $10^3$ to $10^{16}$/cm$^3$,
an elongation set of 1 to 100%, and
a bulk density of 0.03 to 1.10 g/cm$^3$.

The average cell diameter is preferably 0.1 to 200 $\mu$m, more preferably 0.1 to 100 $\mu$m.

The average cell number is preferably $10^4$ to $10^{16}$/cm$^3$, more preferably $10^5$ to $10^{16}$/cm$^3$.

The elongation set is preferably 1 to 60%, more preferably 1 to 50%.

The bulk density is preferably 0.03 to 1.0 g/cm$^3$, more preferably 0.03 to 0.9 g/cm$^3$.

It is preferable that the foam of the invention satisfies the relation of melting point of the foam ($T_{m1}$) to that of the non-foamed resin ($T_{m2}$) represented by the following formula (1):

$$T_{m1}-T_{m2} \geq 5°\ C. \qquad (1)$$

The difference ($T_{m1}-T_{m2}$) is preferably 10° C. or more, more preferably 15° C. or more.

The melting point of the composition not foamed means that of the resin composition which is the same as the thermoplastic polyurethane resin-containing composition containing the thermoplastic polyurethane resin at 20% by weight or more and cured without being foamed.

It is also preferable that the foam of the invention contains chloroform-insolubles at 10% by weight or more, more preferably 20% by weight or more, still more preferably 50% by weight or more.

It is still also preferable that the foam of the invention a residue after chloroform extraction is at 20% by weight or more, still more preferably 50% by weight or more, and that the temperature in losing its weight by 5% of the residue after chloroform extraction is 180° C. or higher, still more preferably 240° C. or higher.

The chloroform-insolubles of the foam is a synonym for the portion insoluble in chloroform, described later (gel content).

The residue after chloroform extraction means the portion insoluble in chloroform and not passing through a 300-mesh on.

The temperature in losing its weight by 5% of the residue after chloroform extraction is that determined by the TG-DTA analysis of the chloroform-insolubles.

The foam of the present invention has an MFR of preferably 0.01 to 50 g/10 minutes, more preferably 0.1 to 40 g/10 minutes. For the measurement of MFR of the foam, the foam is cut to have the maximum width of 3 mm or less, charged in a cylinder and left therein for 6 minutes, and analyzed after the gases are released from the cylinder.

The foam of the present invention has a crystallization heat of preferably 5 j/g or more, more preferably 8 j/g or more.

The foam of the present invention, when required to have certain properties, such as solvent resistance, heat resistance and elongation set, preferably contains the allophanate bond at 0.01 mmol/g to the whole weight of the foam or more, more preferably 0.1 mmol/g or more.

The foam of the present invention, when required to have certain properties, such as water resistance, solvent resistance, heat resistance or the like, contains the urea bond at preferably 0.1 mmol/g of the whole weight of the foam or less, more preferably 0.05 mmol/g or less.

Thermoplastic Polyurethane Resin

The thermoplastic polyurethane resin used in the present invention can be produced by reacting an organic polyisocyanate compound used for production of a common thermoplastic polyurethane resin with a compound having active hydrogen, in the presence of an additive as required. The compound having active hydrogen is preferably a polyol or compound having a polyol as the major component. These may be used either individually or in combination.

The urethane-based thermoplastic composition foam of the present invention is produced by foaming the thermoplastic polyurethane resin-containing composition containing at least a thermoplastic polyurethane resin, and may contain, as required, another thermoplastic resin other than the thermoplastic polyurethane resin-containing composition.

The thermoplastic polyurethane resin-containing composition desirably contains the thermoplastic polyurethane resin at 20 to 100% by weight based on the total of the thermoplastic polyurethane resin and another thermoplastic resin, preferably 20 to 99% by weight, more preferably 40 to 95% by weight, still more preferably 50 to 90% by weight.

The urethane-based thermoplastic polyurethane resin and other thermoplastic elastomer are the essential components in the foaming method 1, whereas the other thermoplastic elastomer is optional in the foaming method 2, as described later. Therefore, the above-described thermoplastic polyurethane resin content of 20 to 100% by weight is applicable to the foaming method 2 and others to the foaming method 1 and 2.

Melt flow rate (determined in accordance with ASTM D-1238-65T) of the thermoplastic polyurethane resin is preferably 0.5 to 50 g/10 minutes, more preferably 0.5 to 20 g/10 minutes, still more preferably 0.5 to 10 g/10 minutes.

Of these thermoplastic polyurethane resins, a urethane-based thermoplastic elastomer (A-1) is preferable.

As the other thermoplastic resin, other thermoplastic elastomer (A-2) is preferable.

One or more additives, such as softening agent, may be incorporated as required, in addition to the thermoplastic polyurethane resin-containing composition.

Therefore, the preferable thermoplastic polyurethane resin-containing composition used in the present invention is the urethane-based thermoplastic elastomer composition (A) comprising the urethane-based thermoplastic elastomer (A-1) and, as required, the other thermoplastic elastomer (A-2).

Therefore, the urethane-based thermoplastic elastomer composition (A), which is also used for the second method, preferably has a melt flow rate (determined in accordance with ASTMD-1238-65T) of 0.5 to 50 g/10 minutes, more preferably 0.5 to 20 g/10 minutes, still more preferably 0.5 to 10 g/10 minutes.

The urethane-based thermoplastic elastomers for the second method may be used either individually or in combination.

Next, the urethane-based thermoplastic elastomer (A-1) and the other thermoplastic elastomer (A-2) will be described.

<Urethane-based Thermoplastic Elastomer (A-1)>

The urethane-based thermoplastic elastomer (A-1) is a resin synthesized by the urethane reaction in which an isocyanate compound is reacted with a compound having active hydrogen, e.g., polyol, optionally in the presence of a chain-extending agent or another additive. It may be produced when the foam is produced or beforehand, or a commercial one.

The isocyanate compounds include aromatic diisocyanates of 6 to 20 carbon atoms (excluding the carbon atom in NCO group), aliphatic diisocyanates of 2 to 18 carbon atoms, alicyclic diisocyanates of 4 to 15 carbon atoms, aromatic aliphatic diisocyanates of 4 to 15 carbon atoms, and modifications thereof (e.g., the modifications containing urethane group, carbodiimide group, allophanate group, urea group, biuret group, urethodione group, urethoimine group, isocyanurate group and oxazolidone group).

More concretely, the isocyanate compounds include tolylene diisocyanate, diphenyl methane diisocyanate, naphthalene diisocyanate, hexamethylene diisocyanate, dicyclomethane diisocyanate, isophorone diisocyanate, xylene diisocyanate, norbornane dimethyl isocyanate and so on.

The compounds having active hydrogen include polyols, polyamine compound, and so on.

The concrete examples of polyol compound include ester-based, adipate-based, ether-based, lactone-based and carbonate-based compounds.

The chain-extending agents include low-molecular-weight diols, alkylene diamines, or the like.

The ester-based and adipate-based polyol compounds include compounds produced by condensation reaction between a polyhydric alcohol (e.g., ethylene glycol, propylene glycol, butanediol, butenediol, hexanediol, pentanediol, neopentyldiol or pentanediol) and dibasic acid (adipic acid, sebacic acid, azelaic acid, terephthalic acid, isophthalic acid, maleic acid, aromatic carboxylic acid or the like).

The ether-based polyol compounds, for example, include polyethylene glycol, polypropylene ether glycol, polytetramethylene ether glycol, polyhexamethylene ether glycol and so on.

The lactone-based polyols include polycaprolactone glycol, polypropiolactone glycol, polyvalerolactone glycol and so on.

The carbonate-based polyols include the compounds obtained by dealcoholization of a polyhydric alcohol (e.g., ethylene glycol, propylene glycol, butanediol, pentanediol, octadiol, nonanediol or the like) with a compound, e.g., diethylene carbonate or dipropylene carbonate.

(Commercial urethane-based thermoplastic elastomers)

The commercial urethane-based thermoplastic elastomers include, for example, Pellethane 2103 series (PTMG ether type), 2102 series (caproester type), 2355 series (polyester adipate type) and 2363 series (PTMG ether type) (trade names of Dow Chemical); Resamine P-1000 and P-7000 series (adipate ester type), P-2000 series (ether type), P-4000 series (caprolactone type) and P-800 series (carbonate type) (trade names of Dainichiseika Color and Chemicals); Pandex T series (trade name of DIC Bayer Polymer); Miractone E and P types (trade names of Nippon Miractone); Estolan (trade name of Takeda Burdaysh Urethane); and Morcene (trade name of Morton). They are hereinafter sometimes referred to as thermoplastic polyurethane elastomers (TPU).

Of these urethane-based thermoplastic elastomers, the adipate-based resins are more preferable, because they can impregnate a larger quantity of foaming agent and control foaming pressure at a lower level. TPU's having a resin hardness of 80 (Shore A) or less are more preferable, because they can be treated at a foaming pressure of around normal pressure.

These urethane-based thermoplastic elastomers (A-1) preferably have a melt flow rate of 0.5 to 50 g/10 minutes, more preferably 0.5 to 20 g/10 minutes, still more preferably 0.5 to 10 g/10 minutes. Melt flow rate is determined in accordance with ASTM D-1238-65T.

<Other Thermoplastic Elastomers (A-2)>

The urethane-based thermoplastic elastomer (A-1) is preferably used in combination with other thermoplastic elastomer (A-2), when improvement of at least one of the properties such as elongation set, heat resistance, melt tension, and solvent resistance, water resistance and so on is desirable. Increasing melt tension leads production of the foam of high expansion ratio, and is desirable when the foam of low density or the like is required, because it can easily give such product.

The other thermoplastic elastomers (A-2) preferably have a melt flow rate of 0.01 to less than 50 g/10 minutes, more preferably 0.1 to 20 g/10 minutes, still more preferably 0.2 to 20 g/10 minutes.

Melt flow rate is determined in accordance with ASTM D-1238-65T.

The weight ratio of the urethane-based thermoplastic elastomer (A-1) to the other thermoplastic elastomer (A-2), (A-1)/(A-2) ratio, as the total of (A-1) and (A-2) is 100, is for the foaming method 2, preferably 20/80 to 100/0, and for the foaming methods 1 and 2, preferably 20/80 to 99/1, more preferably 40/60 to 95/5, still more preferably 50/50 to 90/10.

The other thermoplastic elastomer (A-2), when used in the above ratio, gives the foam of excellent expansion ratio.

The urethane-based thermoplastic elastomer composition (A) for the present invention may contain, as required, 50% by weight or more of a thermoplastic urethane elastomer as the other thermoplastic elastomer (A-2), which is other than the urethane-based thermoplastic elastomer (A-1).

The other thermoplastic elastomers (A-2) used in the present invention include a styrene-based resin (polystyrene, butadiene/styrene copolymer, acrylonitrile/styrene copolymer, acrylonitrile/butadiene/styrene copolymer or the like), ABS resin, polyethylene, polypropylene, ethylene/propylene resin, ethylene/ethyl acrylate resin, polyvinyl chloride, polyvinylidene chloride, polybutene, polycarbonate, polyacetal, polyarylene sulfide, polyphenylene sulfide, polyphenylene ether, polyphenylene oxide, polyvinyl alcohol, polymethylmethacrylate, polyester resin (e.g., polyethylene terephthalate or polybutylene terephthalate), bio-degradable polyester resin (e.g., condensate compound of hydroxycarboxylic acid, e.g., polybutyric acid; or condensate compound of a diol (e.g., polybutylene succinate) and dicarboxylic acid), polyester elastomer (TPEE), polyamide resin, polyimide resin, polyparabanic acid, fluorine resin, polysulfone, polyether sulfone, polyarylate, polyetheretherketone, and liquid-crystalline polymer.

They may be used either individually or in combination.

Of these other thermoplastic elastomers (A-2), more preferable ones include polyisobutylene, butyl rubber, and propylene/ethylene random copolymer and propylene/1-butene random copolymer each containing propylene at 70% by mol or more, when used in combination with an olefin-based thermoplastic elastomer, particularly non-crosslinked rubber-like material, which are the rubber-like material enable to be mixed with crosslinking agent and are difficult to crosslink when kneaded under heating, and hence to decrease in fluidity.

Of these, still more preferable ones include polyisobutylene and butyl rubber, becuase of their functions and handling. It is particularly preferable that polyisobutylene and butyl rubber have a Mooney viscosity ($ML_{1+4}(100°$ C.$)$ of 80 or lower , because of improving fluidity to an olefin-based thermoplastic elastomer.

The other thermoplastic urethane elastomer (A-2), when used, may be used at 5 to 60 parts by weight, preferably 5 to 30 parts, per 100 parts by weight of the urethane-based thermoplastic elastomer composition (A).

<Other Additives>

In the invention, a softening agent (D), plasticizer, wax, dispersant, compatibilizer, crosslinking agent, crosslinking aid, process oil, deposition inhibitor, pigment, weather-resistant stabilizer, antioxidant, filler, fiber reinforcing agent, colorant, crystallization promoter, antimicrobial/antifungi agent, antistatic agent, and metallic powder can be optionally used in accordance with the purpose or use.

The urethane-based thermoplastic elastomer composition (A) can be incorporated with at least one of a plasticizer, wax, dispersant, solubilizer and the like, when its fluidity is preferably to be improved.

When the foam is produced, these other additives may be added in the foam either individually or in combination with each other at the same time, or each may be adequately added in the thermoplastic polyurethane or in the other thermoplastic elastomer (A-2), etc. added as required.

(Softening Agent (D))

The urethane-based thermoplastic elastomer composition (A) in the present invention may be incorporated with a softening agent (D).

One of the examples of the softening agent (D) is a high-boiling-point petroleum fraction, which is normally used in roll processing of rubber to make processing easy by reducing intermolecular force of rubber, to help dispersion of carbon black or the like, and to increase flexibility by decreasing the hardness of vulcanized rubber. As the petroleum fraction, paraffinic, naphthenic or aromatic based fraction can be used.

Softening agents such as those used for rubber can be used in the present invention. The concrete examples of these agents include a mineral oil-based softening agents, process oil, lubricating oil, paraffin, liquidparaffin, polyethylene wax, polypropylene wax, petroleum asphalt, synthetic petroleum-based material (e.g., vaseline), coal tars including coal tar, and coal tar pitch, fatty oil (e.g., castor oil, linseed oil, rapeseed oil, soybean oil and coconut oil), tall oil, wax (e.g., bees wax, carnauba wax and lanolin), fatty acid (e.g., ricinolic acid, palmitic acid, stearic acid, 12-hydroxylated stearic acid, montanic acid, oleic acid and erucic acid) and/or metallic salt thereof, petroleum resin, coumarone-indene resin, synthetic polymer (e.g., atactic polypropylene), ester-based plasticizer (dioctyl phthalate, dioctyl adipate and dioctyl sebacate), microcrystalline wax, liquid polybutadiene or modification or hydrogenated product thereof, and liquid thiokol. Of these, mineral oil-based softening agents are more preferable.

The softening agent (D) is used preferably at 5 to 100 parts by weight), more preferably 5 to 80 parts, still more preferably 5 to 50 parts, per 100 parts by weight of the urethane-based thermoplastic elastomer composition (A).

Use of the softening agent (D) in the above ratio can improve fluidity of the urethane-based thermoplastic elastomer composition (A) without deteriorating heat resistance and tensile characteristics of the foam.

(Plasticizer)

The plasticizers used in the present invention include phthalate-based plasticizers, such as, di-n-butylphthalate, di-2-ethylhexyl phthalate (DOP), di-n-octyl phthalate, diisodecyl phthalate, diisooctyl phthalate, octyldecyl phthalate, butylbenzyl phthalate and di-2-ethylhexyl phosphateisophthalate; aliphatic ester-based plasticizers, such as di-2-ethylhexyl adipate (DOA), di-n-decyl adipate, diisodecyl adipate, dibutyl sebacate and di-2-ethylhexyl sebacate; pyromellitate-based plasticizers, such as trioctyl trimellitate and tridecyl trimellitate; phosphate-based plasticizers, such as tributyl phosphate, tri-2-ethylhexyl phosphate, 2-ethylhexyldiphenyl phosphate, and tricresyl phosphate; epoxy-based plasticizers, such as epoxy-based soybean oil; and polyester-based polymer plasticizers. They may be used either individually or in combination.

The plasticizer is desirably used at 5 to 80 parts by weight), preferably 10 to 60 parts, per 100 parts by weight of the urethane-based thermoplastic elastomer (A-1). The foam may suffer deteriorated soft resinous properties and moldability at less than 5 parts by weight, and excessive bleed-out at more than 80 parts by weight. The ester-based plasticizer is more preferable from the viewpoint of thermal stability and controlled bleed-out.

(Wax)

Wax works as an internal and external lubricant for reducing friction, and hence improves fluidity properties of the TPU. It also works as an effective releasing agent, which prevents the foam from adhering to the mold walls or the like, and also works as an effective dispersant for other additives, such as pigment and antiblocking agent. The waxes used in the present include not only fatty acid esters (e.g., stearate esters and montanate esters) but also the metallic soaps thereof; fatty acid amides (e.g., stearate amides and oleate amides, and higher fatty acid bisamides): montanate ester wax; and polyethylene wax.

The preferable higher fatty acid bisamides are those produced by reacting a saturated higher fatty acid of 14 to 35 carbon atoms with aliphatic diamine of 1 to 10 carbon atoms. The saturated higher fatty acids used include myristic acid, pentadecylic acid, palmitic acid, heptadecylic acid, stearic acid, nonadecanoic acid, arachic acid, behenic acid, lignoserinic acid, cetinic acid, cerotic acid, heptacosanic acid, montanic acid and melissic acid. The aliphatic diamines include methylene diamine, ethylene diamine, trimethylene diamine, tetramethylene diamine, pentamethylene diamine, hexamethylene diamine, 1,7-diaminoheptane, 1,8-diaminooctane, 1,9-diaminononane and 1,10-diaminodecane. Of the higher fatty acid bisamides produced by the reaction between a saturated higher fatty acid and aliphatic diamine, the more preferable ones include methylenebisstearic acid amide, ethylenebisstearic acid amide, tetramethylenebisstearic acid amide, hexamethylenebisstearic acid amide, ethylenebismontanic acid amide, tetramethylenebismontanic acid amide, hexamethylenebismontanic acid amide. Methylenebisstearic acid amide and/or ethylenebisstearic acid amide are still more preferable.

The wax, when used, is incorporated at 10 parts by weight or less, preferably 5 parts or less, per 100 parts of the urethane-based thermoplastic elastomer composition (A).

(Dispersant)

The dispersants used in the present invention include polypropylene modified with (anhydrous) maleic acid, polyethylene modified with (anhydrous) maleic acid, amino-modified low-molecular-weight polypropylene, amino-modified low-molecular-weight polyethylene, polypropylene modified with maleic acid hydrogenated hydroxyl group at the terminal, polyethylene modified with maleic acid hydrogenated hydroxyl group at terminal, and a mixture containing at least one of the above compounds. The preferable ones are polyethylene modified with (anhydrous) maleic acid and polypropylene modified with (anhydrous) maleic acid.

The dispersant normally has a number-average molecular weight of 1,000 to 100,000, preferably 1,000 to 50,000.

The dispersant, when used, is used preferably at 20 parts by weight or less, more preferably 10 parts or less, per 100 parts of the urethane-based thermoplastic elastomer composition (A).

(Compatibilizer)

The compatibilizers include organopolysiloxanes. The organopolysiloxanes include polydimethyl siloxane, polydiphenyl siloxane, polymethylphenyl siloxane, polymethyl hydrogen siloxane and/or modified organopolysiloxanes that these organopolysiloxanes are modified with a compound containing epoxy group, a compound containing amino group, or a compound containing ester bond. Of these, a polydimethyl siloxane is preferable because of dispersability and solubility in the resin, and effect of improving surface appearances, etc.

The compatibilizer, such as organopolysiloxane, is used preferably at 0.1 to 10 parts by weight, more preferably 0.2 to 8 parts, still more preferably 0.3 to 5 parts, per 100 parts of the urethane-based thermoplastic elastomer composition (A). The organopolysiloxane may exhibit insufficient effect of improving surface appearances at less than 0.1 parts by weight. It is undesirable in the amount of more than 10 parts by weight, because the resin may not have a sufficient viscosity to withstand gas pressure during the foaming process, with the result that foams may be broken and the fine cells may not be formed.

(Crosslinking agent)

The urethane-based thermoplastic elastomer composition (A) of the present invention can be produced by the dynamic heat treatment of composition for crosslinking containing the urethane-based thermoplastic elastomer (A-1), optionally the other thermoplastic elastomer (A-2), softening agent (D) or the like, preferably in the presence of a crosslinking agent.

The "dynamic heat treatment" means kneading the above component(s) in the molten state.

The crosslinking agents include those commonly used for thermosetting rubber, such as an organic peroxide, sulfur, phenolic resin, amino resin, quinone and its derivative, amine-based compound, azo compound, and epoxy-based compound. Of these, an organic peroxide is more preferable.

The concrete examples of the organic peroxides include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis(t ert-butylperoxyisopropyl)benzene, 1,1-bis(tert-butylperoxy)-3,3,5-trimethyl cyclohexane, n-butyl-4,4-bis(tert-butylperoxy)valerate, benzoyl peroxide, p-chlorobenzoyl peroxide, 2,4-dichlorobenzoyl peroxide, tert-butylperoxybenzoate, tert-butylperoxyisopropyl carbonate, diacetyl peroxide, lauroyl peroxide and tert-butylcumyl peroxide.

Of these, the more preferable ones are 2,5-dimethyl-2,5-di-(tert-butylperoxy)hexane, 2,5-dimethyl-2,5-di-(tert-butylperoxy)hexyne-3,1,3-bis(t ert-butylperoxyisopropyl)benzene, 1,1-bis (tert-butylperoxy)-3,3,5-trimethyl cyclohexane and n-butyl-4,4-bis(tert-butylperoxy)valerate, because of their low odor and scorch stability. 1,3-bis(tert-butylperoxyisopropyl)benzene is still more preferable.

A bifunctional or more multi-functional isocyanate, used as the starting material for common polyurethane resin, is suitably used for the crosslinking agent.

The crosslinking agent may contain a monofunctional or multi-functional isocyanate derivative selected from the group consisting of polycarbodiimide, polyoxazolidine and isocyanurate.

More concretely, the crosslinking agents include diphenyl methane diisocyanate, toluene diisocyanate, xylilene diisocyanate, metaxylilene diisocyanate, hexamethylene diisocyanate, lysine diisocyanate, isophorone diisocyanate, trimethylhexamethylene diisocyanate and dimmer acid diisocyanate-based ones. The polymer with residual isocyanate group, obtained by the reaction of the above oligomer or polyol, may also be used. Of these, diphenyl methane diisocyanate or the like is more preferable for its low cost and high availability.

The particularly preferable ones include bis(4-isocyanate phenylmethyl)benzene isocyanate, bis(4-isocyanate phenylmethyl)diphenyl methane diisocyanate and polymethylene polyphenylene polyisocyanate.

These isocyanates include polyisocyanate modifications, such as the carbodiimide-modified compounds thereof and block type polyisocyanate modifications with the isocyanate group masked with phenols or lactams.

Of these, the particularly preferable one is a polymethylene polyphenylene polyisocyanate having a number-average molecular weight of 260 to around 800.

Use of a tertiary amine, quaternary ammonium salt, phosphine, imidazole or the like as the catalyst for promoting crosslinking of the polyisocyanate is not limited.

The crosslinking agent is used preferably at 0.05 to 3 parts by weight, more preferably 0.1 to 2 parts by weight, per 100 parts by weight of the urethane-based thermoplastic elastomer composition (A).

(Crosslinking Catalyst)

A crosslinking catalyst may be used to further facilitate the crosslinking reaction. The crosslinking catalysts include tertiary amine-based catalysts, such as monoamines, diamines, triamines, cycloamines, alcoholicaminesand ether amines; and organometallic compounds, such as organotin compounds. When the crosslinking agent is a polyvalent amine and the crosslinkable functional group is epoxy group, the catalyst may be omitted, because the amine and the epoxy group are sufficiently reactive for the crosslinking.

The crosslinking catalyst is used at 0.1 to 5 equivalents. per equivalent of the epoxy group, when the epoxy group is the crosslinkable functional group, preferably 0.1 to 1 equivalent, because it may not exhibit the sufficient effect when present excessively. It may be used at 0.01 to 1% based on the polyisocyanate in the case of isocyanate group, preferably 0.01 to 0.2% viewed from controlling the side reactions.

The crosslinking catalyst, when used, is added preferably at 0.05 to 3 parts by weight, more preferably 0.1 to 2 parts by weight, per 100 parts by weight of the urethane-based thermoplastic elastomer composition (A).

(Crosslinking Aid)

In the present invention, at least one crosslinking aid selected from the group consisting of peroxy crosslinking aid, multi-functional methacrylate monomer and multi-functional vinyl monomer may be used for the crosslinking treatment with the crosslinking agent.

The peroxy crosslinking aids include sulfur, p-quinone dioxime, p,p'-dibenzoyl quinone dioxime, N-methyl-N-4-dinitrosoaniline, nitrosobenzene, diphenyl guanidine and trimethylolpropane-N,N'-m-phenylene dimaleimide.

The multi-functional methacrylate monomers include divinyl benzene, triallyl cyanurate, ethylene glycol dimethacrylate, diethylene glycol dimethacrylate, polyethylene glycol dimethacrylate, trimethylol propane trimethacrylate and allyl methacrylate.

The multi-functional vinyl monomers include vinyl butyrate and vinyl stearate.

Use of the crosslinking aid can allow uniform, moderate crosslinking reaction.

Of these crosslinking aids, divinyl benzene is more suitable in the present invention. It can be easily handled, well compatible with the urethane-based thermoplastic elastomer (A-1) as the major ingredient for the composition to be crosslinked, or other thermoplastic elastomer (A-2), having a function of solubilizing the crosslinking agent, and working as the dispersant for the crosslinking agent. As such, it can exhibit the uniform crosslinking effect by the heat treatment process, and give the crosslinked urethane-based thermoplastic elastomer composition foam with a well-balance between fluidity and other properties.

The crosslinking aid, when used in the present invention, is used preferably at 0.1 to 3% by weight, more preferably 0.3 to 2% by weight, based on the whole composition to be crosslinked.

The crosslinking aid, when used at a content in the above range, gives the crosslinked urethane-based thermoplastic elastomer composition foam whose properties remain unchanged through heat history during the molding process with foaming, because the crosslinking aid is not present as an unreacted monomer in the elastomer. It also secures good fluidity for the molding process, and easily gives the molded article of complex shape.

Foaming Agent or the Like (Carbon Dioxide)

Carbon dioxide used as the foaming agent in the present invention is used at 0.1 to 30 parts by weight, preferably 0.1 to 20 parts by weight, more preferably 0.2 to 20 parts by weight, still more preferably 0.2 to 15 parts by weight, per 100 parts by weight of the thermoplastic polyurethane resin-containing composition, or the urethane-based thermoplastic elastomer composition (A) as its preferred embodiment.

Carbon dioxide as the foaming agent may be used either individually, or in combination with nitrogen, preferably in a molar ratio of 1/9 to 9/1 for the latter case.

It is more preferable to use carbon dioxide in combination with nitrogen than individually, when the other thermoplastic resin (A-2) is a polyester-based resin (e.g., PET, PTEE, PBT or polylactic acid), polycarbonate, polyamide or the like, because of intending to increase fineness of the cells and cell density.

A sufficient expansion ratio may not be obtained, when the foaming agent is used at less than 0.1 parts by weight. On the other hand, carbon dioxide may cause blister type of defective surface appearances of the foam when the foaming agent isusedinmorethan 30 parts, because of a high expansion force of carbon dioxide added, and needs a longer cooling time to form the composition into a desired shape, possibly deteriorating production efficiency because of increased production time.

Carbon dioxide is preferably kept under the supercritical conditions within the extruder before or during the process of mixing with the urethane-based thermoplastic elastomer, viewed from solubility, penetrability, diffusivity or the like into the urethane-based thermoplastic elastomer composition (A) in a molten state.

(Foaming Nucleating Agent)

One or more types of thermo-decomposition (thermally decomposable) foaming agents, which are thermally decomposed to form carbon dioxide and/or nitrogen, may be used as the foaming nucleating agents to foam uniformly in combination with carbon dioxide for the present invention.

The concrete examples of the foaming nucleating agents include oxalic acid, citric acid, succinic acid, sodium bicarbonate, and a mixture thereof. Of these, a mixture of sodium bicarbonate and citric acid is more preferable.

(Thermo-decomposition Foaming Agent)

The thermo-decomposition foaming agents include organic thermo-decomposition foaming agents, such as azodicarbon amide, 4,4'-oxybis(benzenesulfonyl hydrazide), p-toluene sulfonyl hydrazide, azobisisobutylodinitrile, azodiaminobenzene, azohexahydrobenzodinitrile, barium azodicarboxylate, N,N'-dinitrosopentamethylene tetramine, N,N'-dinitroso-N, N'-dimethylterephthalamide, t-butyl aminonitrile, p-toluene sulfonylacetone hydrazone; and inorganic thermo-decomposition foaming agents, such as citric acid, sodium bicarbonate and ammonium carbonate.

One kind or more kinds of these compounds may be used. Of these, azodicarbon amide-based foaming agent is suitably used, becuase it is decomposed at melting point of the thermoplastic polyurethane composition or above, handled very easily, generates a large quantity of gases, and shows decomposing behavior suitable for melt forming of the polyurethane composition.

Of the above thermo-decomposition foaming agents, azodicarbon amide, 4,4'-oxybis (benzenesulfonyl hydrazide), p-toluene sulfonyl hydrazide, sodium bicarbonate and the like have a function of reducing molecular weight of the polyurethane. On the other hand, N,N'-dinitrosopentamethylene tetramine and the like have a function of promoting crosslinking of the polyurethane. Therefore, combination of the foaming agent having a function of reducing molecular weight of the polyurethane with the one having a function of promoting crosslinking of the polyurethane allows the polyurethane to have an adequate crosslink, makes possible to control reduction in melt viscosity, and allows to form the foam excellent in mechanical property, physical property and chemical property, and good in foamed conditions.

The cell size of the obtained foam tends to be uniform, when produced in the presence of such a thermo-decomposition foaming agent.

The thermo-decomposition foaming agent is used preferably at 0.01 to 10 parts by weight, more preferably 0.01 to 5 parts by weight, per 100 parts by weight of the urethane-based thermoplastic elastomer composition (A). The total quantity of carbon dioxide and the thermo-decomposition foaming agent is preferably 0.1 to 30 parts by weight, more preferably 0.1 to 20 parts by weight.

(Other Foaming Additives)

One or more types of foaming additives may be added to obtain the urethane-based thermoplastic elastomer composition (A) used in the present invention, in order to improve the foam surface appearances without breaking the obtained foams. The known additives commonly used for foam molding may be used as these additives. The suitable ones include aliphatic carboxylic acids and derivatives thereof.

The aliphatic carboxylic acids and derivatives thereof include, for example, aliphatic carboxylic acids, acid anhydrides, alkali metal salts and alkali-earth metal salts thereof, etc. The preferable aliphatic carboxylic acids are include an aliphatic carboxylic acid of 3 to 30 carbon atoms, such as lauric acid, stearic acid, crotonic acid, oleic acid, maleic acid, glutaric acid, montanic acid, etc. Of these, stearic acid and montanic acid and derivatives thereof are more preferable in dispersability and solubility in the resin and surface appearance improvement effect and so on. Still more preferable ones are alkali metal and alkali-earth metal salts of stearic acid, and most preferable ones are zinc stearate and calcium stearate.

The other foaming additive is used preferably at 0.01 to 10 parts by weight, more preferably 0.05 to 8 parts by weight, still more preferably 0.1 to 5 parts by weight, per 100 parts by weight of the urethane-based thermoplastic elastomer composition (A).

The additive can easily prevent breaking of the foams when the additives is added at 0.01 parts by weight or more. And the additives can keep the resin at a sufficient viscosity to withstand the gas pressure during the foaming process and good surface appearances without breaking the foams when the additives are added at 10 parts by weight or less.

An inorganic fine powder may be used as the foaming additive, for the urethane-based thermoplastic elastomer composition (A) of the present invention, which works as the foaming nucleating agent.

The fine inorganic powders include talc, calcium carbonate, clay, magnesium oxide, zinc oxide, glass beads, glass powder, titanium oxide, carbon black and silicic anhydride. More preferable ones are talc, calcium carbonate, titanium oxide and silicic anhydride, and talc is still more preferable.

The fine inorganic powder is preferably 50 $\mu$m or less in particle size, more preferably 10 $\mu$m or less, still more preferably 5 $\mu$m or less.

The fine inorganic powder having a particle size of 50 $\mu$m or less can decrease cell size of the foam, and improve its Izod impact strength and surface appearances.

The fine inorganic powder is used preferably at 0.01 to 40 parts by weight, more preferably 0.05 to 20 parts by weight, still more preferably 0.05 to 10 parts by weight, most preferably 0.1 to 5 parts by weight, per 100 parts by weight of the urethane-based thermoplastic elastomer composition (A).

It can further improve the foam surface appearances, when the inorganic fine powder is used in the range of 0.01 to 40 parts by weight.

Method for Producing a Urethane-based Thermoplastic Elastomer Composition Foam

The first method of the present invention for producing a urethane-based thermoplastic elastomer composition foam is characterized in that the first method includes the step in which a thermoplastic polyurethane resin, optionally with other thermoplastic resin, additives or the like, is molten to dissolve carbon dioxide (gas dissolving step), and the step in which the molten composition obtained in the above step is cooled (cooling step).

The second method of the present invention for producing a urethane-based thermoplastic elastomer composition foam is characterized in that the second method includes the step in which the molten composition, obtained though the cooling step, is charged in or transferred to a space controlled at a lower pressure than the cooling step to produce the cell nuclei in the molten urethane-based thermoplastic elastomer composition, and then is foamed while controlling its expansion ratio (foaming controlling step).

In the first production method, the method for producing the foam, in which the urethane-based thermoplastic resin and other thermoplastic elastomer are essential components, which comprises the gas dissolving step and the cooling step, and in which the foaming is performed after the cooling step or in the cooling step, is referred to as the foaming method 1. In this method, the step for controlling the expansion ratio is not always needed.

In the second production method, the method including the gas dissolving step, the cooling step and the foaming controlling step is sometimes referred to as the foaming method 2.

When the foam excellent in solvent resistance and heat resistance and elongation set is to be obtained, the thermoplastic polyurethane resin preferably contains a urethane-based thermoplastic elastomer. More concretely, the thermoplastic polyurethane resin is preferably the urethane-based thermoplastic elastomer (A-1), and the other resin is preferably the thermoplastic elastomer (A-2). The urethane-based thermoplastic elastomer composition (A), comprising these elastomers, is preferably used as the resin component.

These production methods are suitably used for producing a foam comprising the composition containing the thermoplastic polyurethane resin. These methods are described in detail below.

The method of the present invention for producing the foam preferably involves the dynamic crosslinking, in order to produce the foam excellent in solvent resistance and heat resistance, and elongation set. In the dynamic crosslinking, at least 70% of crosslinking is preferably completed in the gas dissolving step and the cooling step, and the dynamic crosslinking is particularly preferably effected mainly in the gas dissolving step.

In this specification, the crosslinking means the phenomenon that an apparent molecular weight of the polymer in the composition is increased when crosslinking prevails over the competing decomposition in the competition reaction between decomposition reaction and crosslinking reaction which are caused by the reaction of the polymer with a crosslinking agent under heating. On the other hand, the decomposition means the phenomenon that an apparent molecular weight of the polymer is decreased when the decomposition prevails over the competing crosslinking.

The dynamic crosslinking means the crosslinking effected by the dynamic heat treatment, described below.

The dynamic heat treatment is effected by a kneading machine, such as an open type mixing roll, closed type Banbury mixer, kneader, extruder (monoaxial or biaxial) or continuous mixer, preferably by a closed type kneading machine. It is also preferably effected under an inert gas atmosphere, such as nitrogen, carbon dioxide and so on.

The kneading is preferably effected at a temperature at which half-life period of the crosslinking agent used is less than 1 minute. It is desirable that kneading temperature is preferably 140 to 240° C., more preferably 160 to 230° C., and kneading time is preferably 1 to 20 minutes, more preferably 1 to 5 minutes. The shear force is that normally associated with kneading, is desirably decided in the range of preferably 10 to $10^4$ sec$^{-1}$, more preferably $10^2$ to $10^4$ sec$^{-1}$.

When the foam excellent in solvent resistance, heat resistance, and elongation set is to be produced, in the forming method 2 is used, the urethane-based thermoplastic elastomer (A-1) is mixed with the other thermoplastic elastomer (A-2) and optionally a mineral oil-based softening agent (D) or the like beforehand. These components are uniformly kneaded and pelletized, and the resultant pellets are uniformly mixed with a crosslinking agent dissolved in divinyl benzene, and, optionally with crosslinking aid, vulcanization promoter or the like by a known machine, such as tumbler kneader, V-shaped Brabender, or Henschelmixer. Mixing is performed preferably at 50° C. or lower. The pelletizing conditions can be adequately set.

When the foam is produced by the forming method 2, the urethane-based thermoplastic elastomer composition (A) for the present invention is preferably prepared by treating the urethane-based thermoplastic elastomer (A-1) under the dynamic heat treatment conditions, optionally together with the other thermoplastic elastomer (A-2) and a mineral oil-based softening agent (D) or the like, preferably in the presence of a crosslinking agent.

The foaming methods 1 and 2 are described below, the method 2 first.

<Foaming Method 2>

The method 2 of the present invention for producing the urethane-based thermoplastic elastomer composition foam includes the step (gas dissolving step) in which to 100 parts by weight of the thermoplastic polyurethane resin in a molten state, 0.1 to 30 parts by weight of carbon dioxide is added and mixed, to form a molten thermoplastic polyurethane resin composition, and the step (foaming controlling step) in which the obtained molten thermopalstic polyurethane composition after the step that the temperature of the molten thermoplastic polyurethane composition is lowered (in the cooling step), is charged in or transferred to a space controlled at a lower pressure than that of the cooling step to produce the cell nuclei in the molten thermoplastic polyurethane resin composition, and then is foamed while controlling its expansion ratio.

The thermoplastic polyurethane resin is preferably the urethane-based thermoplastic elastomer composition in the molten state.

When the foam excellent in solvent resistance, heat resistance, and elongation set is to be produced, the thermoplastic polyurethane resin preferably contains a urethane-based thermoplastic elastomer (A-1), and optionally other thermoplastic resin and mineral oil-based softening agent or the like.

More concretely, it is preferable to use the urethane-based thermoplastic elastomer composition (A) of the molten state comprising the urethane-based thermoplastic elastomer (A-1), and optionally the other thermoplastic elastomer (A-2), in a ratio described earlier. The suitable method of producing the foam of the urethane-based thermoplastic elastomer composition includes the step (gas dissolving step) in which to 100 parts by weight of the urethane-based thermoplastic elastomer composition (A), 0.1 to 30 parts by weight of carbon dioxide is mixed and added, to form a molten urethane-based thermoplastic elastomer composition (C), and the step (foaming controlling step) in which the molten urethane-based thermoplastic elastomer composition (C) obtained after the step (cooling step) in which the temperature of the molten urethane-based thermoplastic elastomer composition (C) is lowered is charged in or transferred to a space controlled at a lower pressure than the cooling step to produce the cell nuclei in the molten urethane-based thermoplastic elastomer composition (C), and then is foamed while controlling its expansion ratio.

In the gas dissolving step, the state in which the thermoplastic polyurethane resin may be incorporated, optionally, with an aliphatic carboxylic acid, derivative thereof, foaming nucleating agent, inorganic fine powder or the like, namely either the state to include them in the thermoplastic polyurethane resin beforehand or separately. It may be the state containing a thermally decomposable foaming agent in the gas dissolving step within limits not harmful to the object of the present invention.

Each of the steps will be described below. The thermoplasstic polyurethane resin, the molten urethane-based thermoplastic elastomer composition (A) in the molten state composed of the urethane-based thermoplastic elastomer (A-1) and, as required, the other thermoplastic elastomer (A-2) may be mentioned as an example of the thermoplastic polyurethane resin.

(Gas Dissolving Step)

In the gas dissolving step, the thermoplastic polyurethane resin (preferably urethane-based thermoplastic elastomer composition (A)) is molten preferably at 100 to 240° C., more preferably 110 to 240° C., still more preferably 140 to 230° C.

In the gas dissolving step, the method to add a foaming agent to the molten urethane-based thermoplastic elastomer composition (A) can be, for example, the method that gaseous carbon dioxide may be added directly or after being pressurized, or liquefied carbon dioxide may be added by a plunger pump or the like.

In the gas dissolving step, it is preferable that carbon dioxide (B) to be added is kept at a constant pressure at 7.4 MPa (critical pressure of carbon dioxide) to 40 MPa and not less than the critical temperature of carbondioxide (31° C.), to become a supercritical carbon dioxide, and then the supercritical carbon dioxide is added to the molten urethane-based thermoplastic elastomer composition.

It is also preferable that the addition method of carbon dioxide in the gas dissolving step is the one that carbon dioxide in a liquified form is added to a pump to charge while keeping in a liquified form, and under the charging pressure of carbon dioxide by the pump being kept in a constant pressure of critical pressure of carbon dioxide (7.4 MPa) to 40 Mpa, and the carbon dioxide is charged by the pump, and the carbon dioxide charged from the pump is heated to a critical temperature of carbon dioxide (31° C.) or higher, to be a supercritical carbon dioxide, and then the supercritical carbon dioxide is added to said urethane-based thermoplastic elastomer composition of a molten state.

FIG. 1, for example, outlines showing one example of the method for producing the urethane-based thermoplastic elastomer composition foam. As shown in FIG. 1, in the suitably used method, carbon dioxide is charged from the liquefied carbon dioxide cylinder (4) into the metering pump (5) while being kept liquid state, discharged from the metering pump (5) at a constant pressure between 7.4 MPa (critical pressure of carbon dioxide) to 40 MPa while being controlled by the pressure regulator (7), and then heated to not less than critical temperature of carbon dioxide of 31° C. to become the supercritical carbon dioxide, after that the supercritical carbon oxide is added to the molten urethane-based thermoplastic elastomer composition (A).

(Cooling Step)

In the cooling step, a temperature of the molten thermoplastic polyurethane composition (preferably the molten urethane-based thermoplastic elastomer composition (C)) obtained by the gas dissolving step is lowered to not less than the plasticizing temperature of said composition and not more than the melting temperature in the gas dissolving step. It is preferable that the temperature of the molten thermoplastic polyurethane resin composition (preferably the molten urethane-based thermoplastic elastomer composition (C)) obtained by the gas dissolving step is kept at 10 to 100° C. lower than the temperature in the gas dissolving step.

In the cooling step, the molten thermoplastic polyurethane resin composition obtained by the gas dissolving step is kept at 50 to 230° C., more preferably at 80 to 220° C.

Thus obtained molten thermoplastic polyurethane resin composition (preferably the molten urethane-based thermoplastic elastomer composition (C)) is preferably handled in such a way that carbon dioxide is not separated before the gas dissolving and the cooling steps are completed. For this, it is preferable to keep the pressure and the temperature in the system existing the molten urethane-based thermoplastic elastomer composition in the gas dissolving step and the cooling step at the critical pressure of carbon dioxide (7.4 MPa) or more and critical temperature of carbon dioxide, (31° C.) or more.

(Foaming Controlling Step)

The molten thermoplastic polyurethane resin composition (preferably the molten urethane-based thermoplastic elastomer composition (C)) obtained through the gas dissolving step and the cooling step can further include a foaming controlling step to foam said composition. This step is described below by the molten urethane-based thermoplastic elastomer composition (C) as the example.

The foaming controlling step is the step charging or transferring the molten urethane-based thermoplastic elastomer composition (C) in or to a space controlled at a lower pressure than that in the cooling step, and after forming the cell nuclei in the molten urethane-based thermoplastic elastomer composition (C), and then, foaming while controlling its expansion ratio.

The space in which the cell nuclei are generated and the space in which the expansion ratio is controlled may be common or separate. When the common space is adopted, the expansion ratio is controlled by the pressure loss of the molten urethane-based thermoplastic elastomer composition (C) being moved while foaming inside the space. When the expansion ratio is controlled in the separate space, the pressure in that space can be controlled separately from the space that the cell nuclei are generated, and the expansion ratio can be controlled also in this case by the pressure loss of resin being moved while foaming inside the space.

The expansion ratio can also be controlled by another method, such as the molten urethane-based thermoplastic elastomer composition (C) is cooled to its crystallization temperature or below after the cell nuclei are generated, and the growth of the cell nuclei generated is controlled.

Pressure in the space in which the cell nuclei are generated is preferably controlled at 0.1 to 20 MPa lower than that in the cooling step, more preferably at 0.1 to 15 MPa lower.

When the expansion ratio is controlled by generating the pressure loss in the space, the pressure is based on the differential pressure between the pressure observed immediately after the cooling step is started (namely the pressure observed while the composition conveys a distance of 2D (D: screw diameter) from the point at which the cooling step is started) and the pressure observed immediately after the composition flows into the cell nuclei generating step from the cooling step (namely the pressure observed while the composition conveys a distance of 2D from the point at which the cooling step is ended).

As for the concrete pressure in the space in which the cell nuclei are generated, the preferable pressure is 7.4 to 20 MPa, more preferably 7.4 to 15 MPa.

The pressure, when the expansion ratio is controlled by generating the pressure loss in the space, is the same as the above case, such as the difference observed of the pressure difference is based on the pressure observed immediately after the space of the generating cell nuclei from the cooling step (namely the pressure observed while the composition conveys a distance of 2D from the point at which the cooling step is ended).

When the expansion ratio is controlled separately from the space for generating the cell nuclei, the pressure is preferably controlled at 0.1 to 10 MPa lower than that of the space for generating the cell nuclei, more preferably 0.1 to 5 MPa lower.

As for the concrete pressure in the space in which the expansion ratio is controlled, the preferable pressure is 7.4 to 20 MPa, more preferably 7.4 to 10 MPa.

The pressure, when the expansion ratio is controlled by generating the pressure loss in the space, is the same as the above case, such as the difference observed on the pressure difference is based on the pressure observed immediately after the space of controlling the expansion ratio from the space of generating the cell nuclei (namely the pressure observed while the composition conveys a distance of 2D from the point at which each space is started).

One of the concrete examples of the foaming controlling step is the step that: for example, by means of an injector or the like, a given quantity of the molten urethane-based thermoplastic elastomer composition is charged in or transferred to a space to be foamed, such as a mold, for example, to the space for foaming such as mold or die; and in the molten urethane-based thermoplastic elastomer composition (C), which is charged by injection in the mold in case of the mold, and, which is transferred to die in case of die, after that the cell nuclei are generated in the molten urethane-based thermoplastic elastomer composition (C) by lowering pressure in the space of the mold or the die, the molten urethane-based thermoplastic elastomer composition is foamed to obtain the urethane-based thermoplastic elastomer composition foam (thermoplastic polyurethane resin composition foam when molten thermoplastic polyurethane resin composition is used).

In the invention, for forming the urethane-based thermoplastic elastomer composition foam, molders used for the known resin forming methods, such as extrusion molding, injection molding, blow molding, extrusion blow molding, injection blow molding, inflation molding, stamping mold molding, compression molding and beads molding, can be used. A continuous plasticizing machine, described later, is included in these molders.

Product shape of the urethane-based thermoplastic elastomer composition foam of the present invention is not limited. For example, product shapes of the urethane-based thermoplastic elastomer composition foam formed by extrusion molding is not limited, and include shapes of sheet, plate, rectangular shape, pipe, tube, cylinder, ellipse, two-by-two matrix, strand, powder, bead, filament, net, extruded unique shape, extruded multi-layered structure, and wire coating.

Expansion ratio of the urethane-based thermoplastic elastomer composition foam of the present invention is not limited, but an article of low ratio of 1 to 4 and an article of high ratio of 4 to 50 are suitable for practical production or industrial production.

<Foaming Method 1>

The foaming method 1 of the present invention includes:
the step (gas dissolving step) in which to 100 parts by weight of the thermoplastic polyurethane resin composition (preferably urethane-based thermoplastic elastomer composition (A)) in a molten state, comprising 20 to 99 parts by weight of a thermoplastic polyurethane resin (preferably urethane-based thermoplastic elastomer (A-1)) and 80 parts by weight or less, preferably 1 to 80 parts of an elastomer comprising thermoplastic resin except urethane (other thermoplastic elastomer (A-2)) (i.e., the upper limit of the (A-2) content is 80 parts by weight) 0.1 to 30 parts by weight of carbon dioxide is added, to mix and dissolve carbon dioxide in the thermoplastic polyurethane resin composition, and the step (cooling step) in which the temperature of the molten composition obtained in the gas dissolving step is lowered. The thermoplastic polyurethane resin is preferably the urethane-based thermoplastic elastomer, in order to produce the foam excellent in solvent resistance, heat resistance and in elongation set.

The elastomer composition can be prepared by, e.g., uniformly mixing the urethane-based thermoplastic elastomer (A-1) with the additive(s) described earlier or the like and, as required, the other thermoplastic elastomer (A-2), by a high-speed agitator or the like, and melting and kneading the resultant mixture by a monoaxial or multi-axial extruder, mixing roll, kneader or Brabender each having sufficient kneading ability. The urethane-based thermoplastic elastomer (A-1), the additive(s) and the other thermoplastic elastomer (A-2) optionally used may be used at the state of being uniformly mixed with each other.

As a result, this produces the crosslinked urethane-based thermoplastic elastomer composition (A) can be obtained.

When extrusion molding is adopted for production of the urethane-based thermoplastic elastomer composition (A), it is preferable to incorporate the urethane-based thermoplastic elastomer (A-1) and the other thermoplastic elastomer (A-2), preferably in an amount of (A-1) of 40 to 95 parts by weight, (A-2) of 1 to 60 parts by weight, more preferably (A-1) of 60 to 95 parts by weight, (A-2) of 1 to 25 parts by weight, still more preferably (A-1) of 70 to 95 parts by weight, (A-2) of 1 to 10 parts by weight, each based on 100 parts of urethane-based thermoplastic elastomer composition (A). When the other thermoplastic elastomer (A-2) in the above ratio is used, the foamed composition excellent in flexibility and heat resistance and high expansion ratio, being difficult to produce with the urethane-based thermoplastic elastomer (A-1) alone can be obtained. The above parts are based on the whole composition, including the urethane-based thermoplastic elastomer (A-1), other thermoplastic elastomer (A-2) and other additives.

The gas dissolving step and the cooling steps for the foaming method 1 may be effected in the same manner as those for the foaming method 2.

<Apparatus for Producing the Urethane-based Thermoplastic Elastomer Composition Foam>

In order to produce the urethane-based thermoplastic elastomer composition foam by the method of the present invention, it is recommended to use the production apparatus which operates under the same conditions as those adopted by the method of the present invention, described above.

In the cooling means corresponding to the cooling step of the foaming method 1 or 2, the molten thermoplastic polyurethane resin composition obtained by the gas dissolving step is preferably in the range of 110 to 230° C. or above. It is necessary to configure the apparatus in such a way that it can lower the temperature of the molten urethane-based thermoplastic elastomer composition at not less than the plasticizing temperature of the molten urethane-based thermoplastic elastomer composition, not more than the melting temperature adopted by the gas dissolving step and in the range of 130 to 230° C. The other configurations of the apparatus are recommended in such a way that they can keep the conditions for the method of the present invention, described earlier.

<Concrete Examples of the Method for Producing the Urethane-based Thermoplastic Elastomer Composition Foam>

One example of the method of producing the foam of the present invention by injection molding is described in detail by referring to FIG. 1.

The injector (2) equipped with the injection plunger (11) is connected, via the on-off valve (10), to the resin plasticizing cylinder (1) equipped with a line at which a foaming agent is added to the molten urethane-based thermoplastic elastomer composition (A). The urethane-based thermoplastic elastomer composition (A), charged in the resin plasticizing cylinder (1), is incorporated therein with carbon dioxide while being heated and molten, to prepare a molten urethane-based thermoplastic elastomer composition.

Then, the molten urethane-based thermoplastic elastomer composition is sent to the injector (2) equipped with the injection plunger (11). When the on-off valve (10) is closed after sending the resin plasticizing cylinder (1) and injector (2) are isolated from each other. The resin plasticizing cylinder (1) continuously forms the molten urethane-based thermoplastic elastomer composition without stopping while the molten urethane-based thermoplastic elastomer composition is weighed and injected into the mold (3) by the injector (2). In this case, the molten urethane-based thermoplastic elastomer composition is not measured, when sent to the injector (2), pressure in the resin plasticizing cylinder (1) increases, which, however, should cause no problem for continuing the gas dissolving step and the cooling step, because the compatible state of the molten urethane-based thermoplastic elastomer composition compatible is not destroyed by increasing a pressure. However, the molten urethane-based thermoplastic elastomer composition may be discharged from the system via the on-off valve (10), when the pressure capacity of the resin plasticizing cylinder (1) happens to have a problem. Such a design is also within the scope of the present invention.

The injector (2) starts injection on completion of the measuring section (the metering). The common molder loses back pressure once the measuring section is completed. However, the molder for the present invention is designed in such a way to keep a back pressure until the injection is completed after start of the measuring section, to prevent the foaming agent from being separated from the urethane-based thermoplastic elastomer composition. The back pressure level is not limited, so long as it prevents the separation of the foaming agent and the urethane-based thermoplastic elastomer composition, but is preferably kept at not less than the critical pressure of the foaming agent.

Therefore, the molten urethane-based thermoplastic elastomer composition formed in the resin plasticizing cylinder (1) is injected in the mold (3) without a phase separation between the foaming agent and the urethane-based thermoplastic elastomer composition.

The foaming controlling step is effected in the mold (3) for injecting the molten urethane-based thermoplastic elastomer composition therein followed by releasing the high-pressure gas filled in the mold (3) and/or partially or fully moving the core of the mold (3) backwards.

Figure 2:
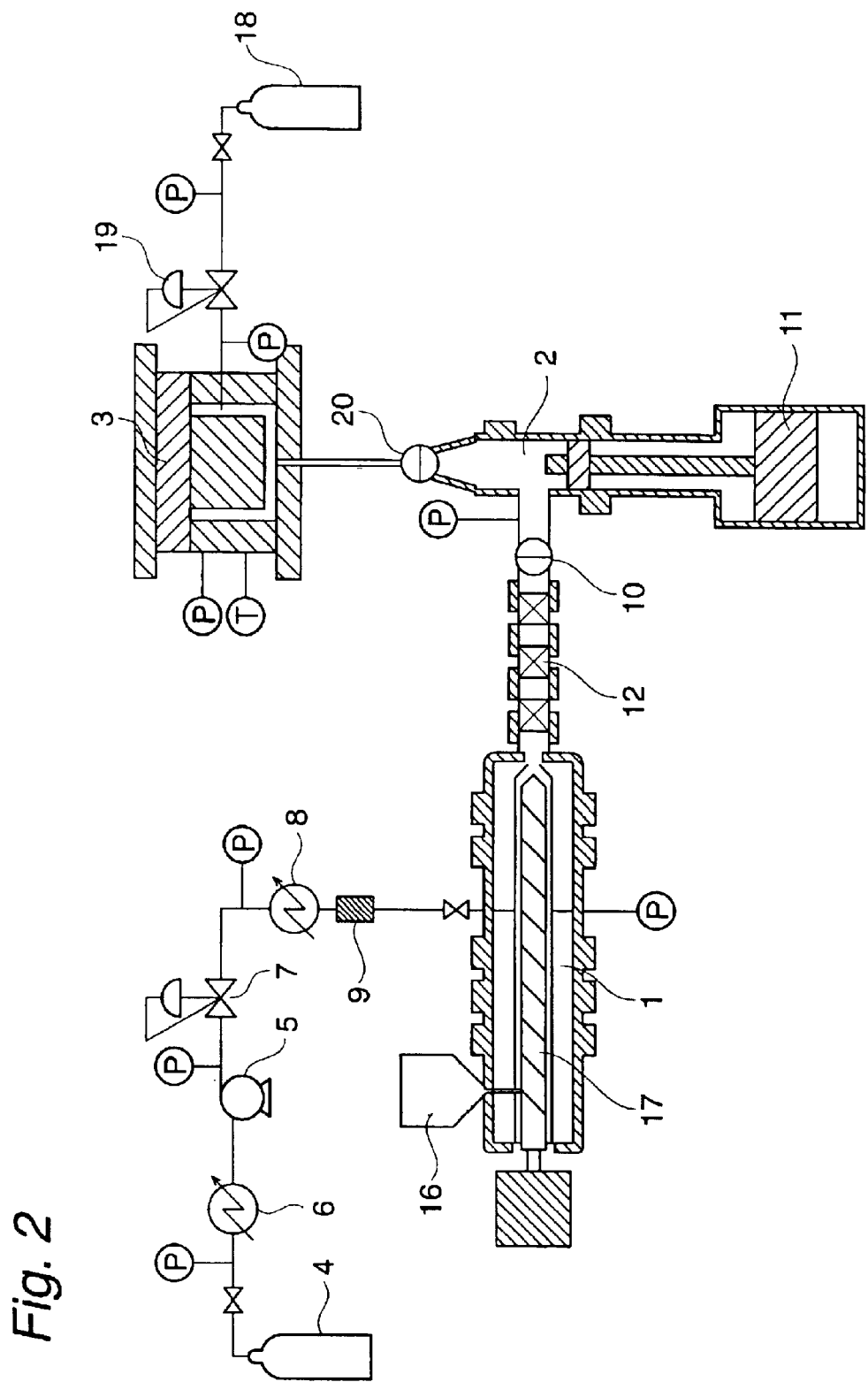
FIG. 2 schematically shows the structure of another example of the method of the present invention for producing a urethane-based thermoplastic elastomer foam.

FIG. 2 illustrates one of the embodiments of the present invention by injection molding. Because of providing the adapter (12) having a mixing zone between the resin plasticizing cylinder (1) equipped with a line through which the foaming agent is added to the molten urethane-based thermoplastic elastomer composition, and the injector (2) equipped with the injection plunger (11), wherein the mixing zone is connected, to the discharge line of the resin plasticizing cylinder (1) connected with the injector (2), via the on-off valve (10), the mixing between the molten urethane-based thermoplastic elastomer and carbon dioxide can be improved more. Furthermore, it becomes easy to form a compatible state between urethane-based thermoplastic elastomer composition and carbon dioxide and also becomes easy to cool the molten urethane-based thermoplastic elastomer composition to have the viscosity suitable for the subsequent injection and foaming by controlling the temperature of the adapter (12).

The adapter (12) having the mixing zone is not limited, but it is preferably equipped with a built-in static mixer, because kneading and cooling the molten urethane-based thermoplastic elastomer composition are effected.

Figure 3:
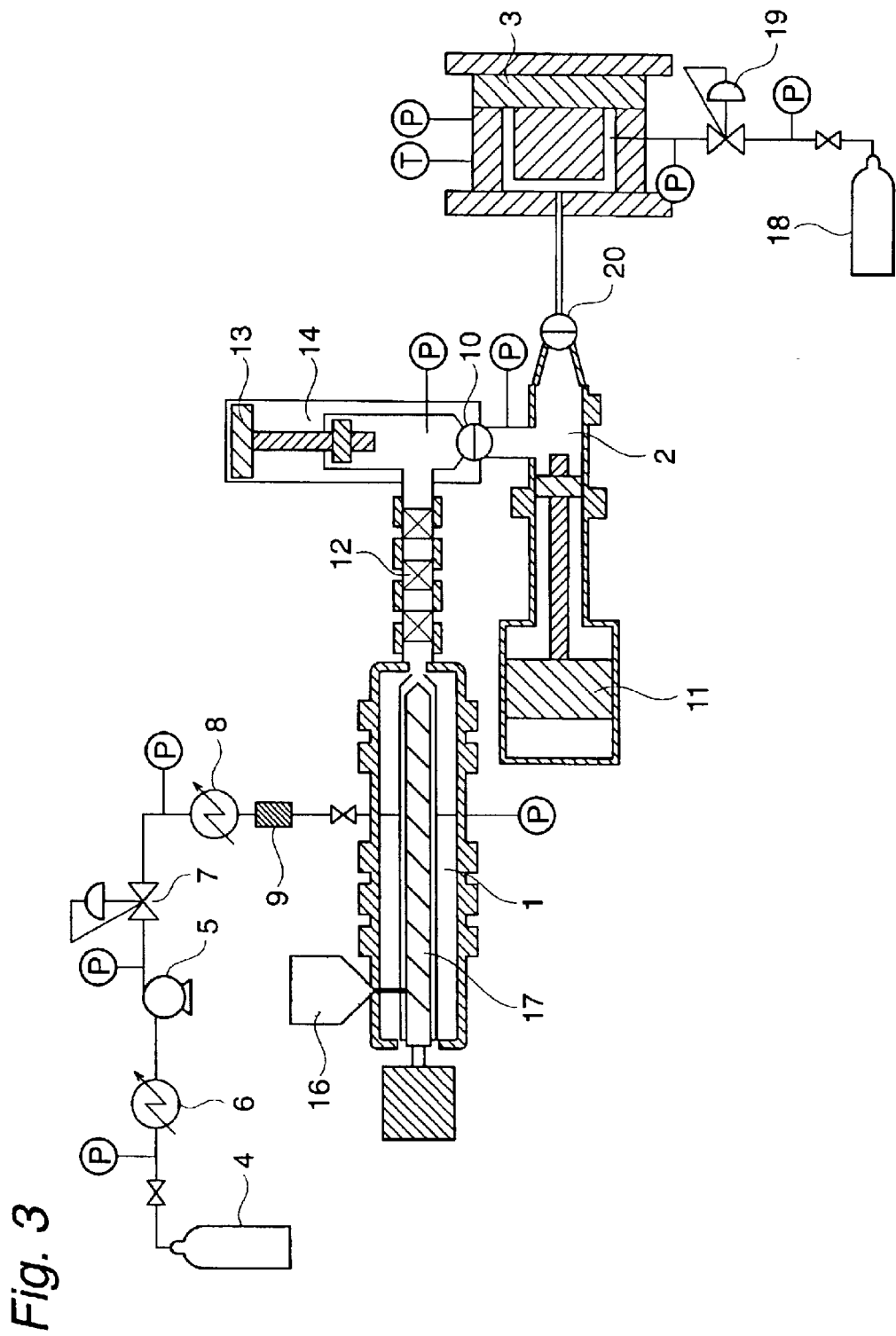
FIG. 3 schematically shows the structure of still another example of the method of the present invention for producing a urethane-based thermoplastic elastomer foam.

FIG. 3 illustrates another embodiment of the present invention relating to injection molding. The system is provided with the resin accumulator (14) having the resin accumulator plunger (13), which is located upstream of the injector (2) having the injection plunger (11) and connected to the injector (2) via the on-off valve (10).

It facilitates to keep a given pressure within the system, to be easy to keep the mixture state of the molten urethane-based thermoplastic elastomer composition, and to give the better surface appearances of the foamed product, because the molten urethane-based thermoplastic elastomer composition flowing from the resin plasticizing cylinder (1) is sent to the resin accumulator (14) provided immediately upstream of the on-off valve (10) while the on-off valve (10) is switched off to inject the composition into the mold (3) by the injection plunger (11) after the completion of the measuring, and the molten urethane based thermoplastic elastomer composition flowing into the resin accumulator (14) moves the plunger backwards to control pressure in the accumulator (14).

Figure 4:
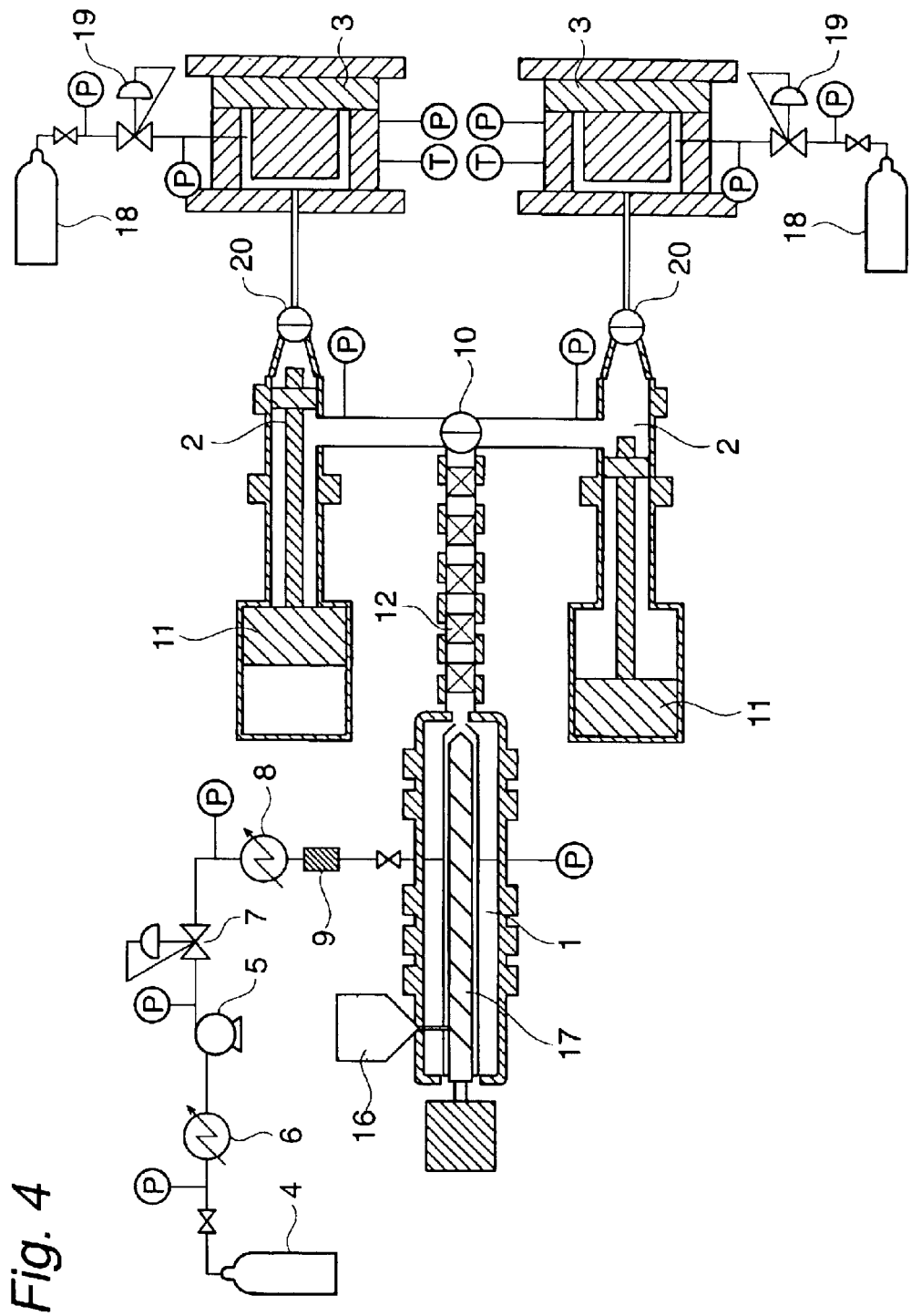
FIG. 4 schematically shows the structure of still another example of the method of the present invention for producing a urethane-based thermoplastic elastomer foam.

FIG. 4 illustrates still another embodiment of the present invention relating to injection molding.

As shown, the resin accumulator (14) equipped with plunger can be replaced by the injector (2) equipped with one more injection plunger (11). This design is desirable, because it facilitates to keep a desired pressure within the system, to become easy to keep the mixture state of the molten urethane-based thermoplastic elastomer composition, and to give the better surface appearances of the foamed product.

Figure 5:
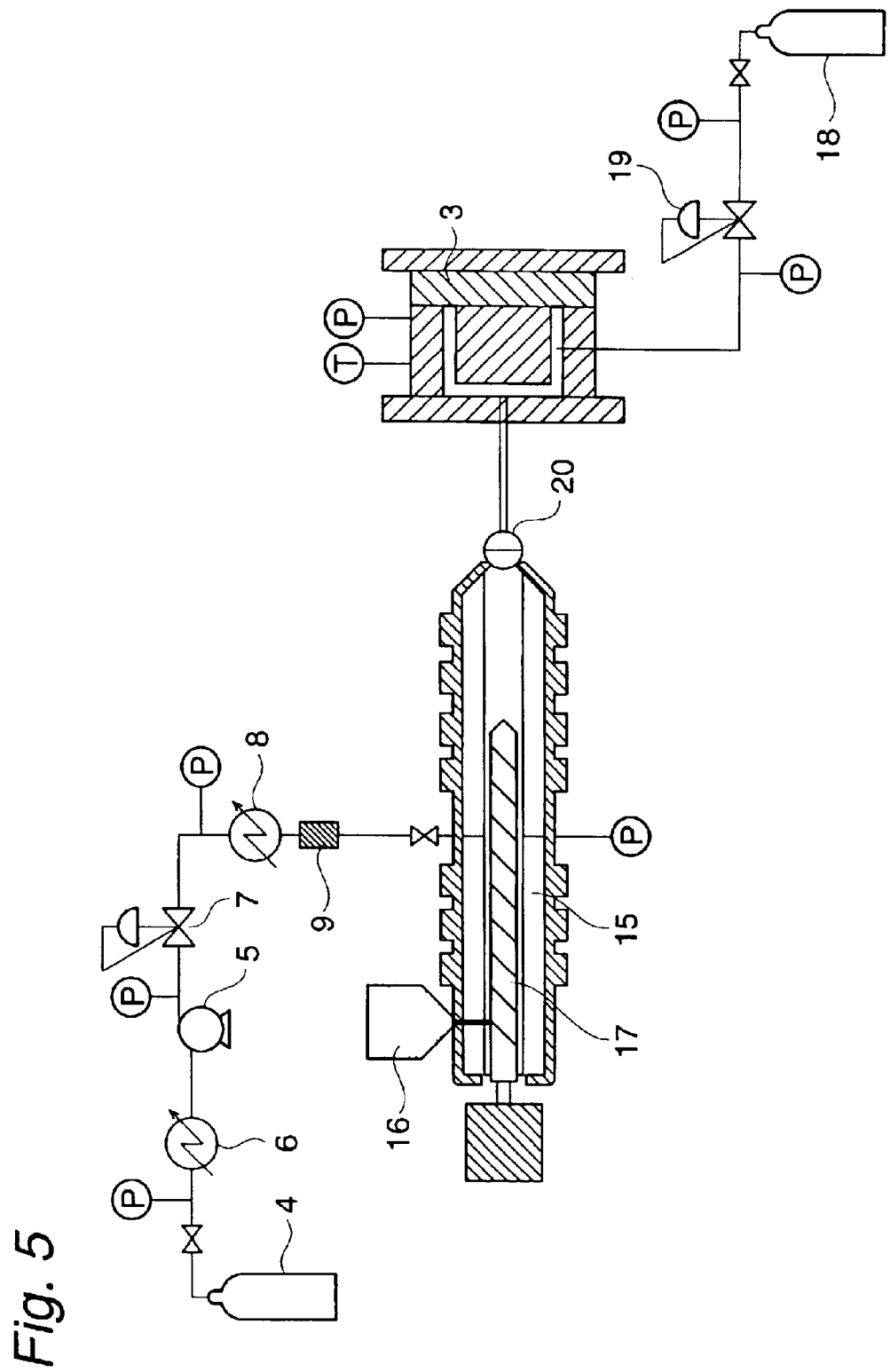
FIG. 5 schematically shows the structure of still another example of the method of the present invention for producing a urethane-based thermoplastic elastomer foam.

The injection molder with the resin plasticizing cylinder (1) and injector (2) separated from each other, such as the one shown in each of FIGS. 1 to 4, can facilitate to keep at a pressure for preventing the urethane-based thermoplastic elastomer composition and foaming agent from being separated in each other, and hence to produce the thermoplastic elastomer composition foam of the invention. However, the inline-screw type injection molder (15) shown in FIG. 5 can also produce the urethane-based thermoplastic elastomer composition foam, so long as the injection molder which can always keep a back pressure while metering and injecting with dissolving and cooling the gas.

The gas dissolving step for forming the mixture state of the urethane-based thermoplastic elastomer composition and carbon dioxide of the invention is the step in which the urethane-based thermoplastic elastomer composition is molten under heating in the resin plasticizing cylinder (1), and to said molten urethane-based thermoplastic elastomer composition, carbon dioxide is added to mix uniformly, in the example for production method of the urethane-based thermoplastic elastomer composition foam as shown in FIG. 1.

The cooling step or the cooling means is the step or means to adjust the molten urethane-based thermoplastic elastomer is cooled to adjust that the composition has a viscosity suitable for injection and foaming.

These gas dissolving step and cooling step are effected by the resin plasticizing cylinder (1) and adaptor (12) in the embodiment shown in FIG. 2 of the examples of producing method of the urethane-based thermoplastic elastomer composition foam. These gas dissolving step and cooling step are effected by the resin plasticizing cylinder (1), adaptor (12) and resin accumulator (14) in the embodiment shown in FIG. 3 of producing the foam of the urethane-based thermoplastic elastomer composition.

In the foaming controlling step, the molten urethane-based thermoplastic elastomer composition controlled at a temperature to have a viscosity suitable for injection and foaming is metered at the injector (2) and injected by the injection plunger (11); and then the molten urethane-based thermoplastic elastomer composition injected into the mold (3) is foamed by reducing a pressure from pressured state generating the cell nuclei and controlling expansion ratio.

Of these steps, at least the gas dissolving step and cooling step can be effected in accordance with the following methods disclosed by Japanese Patent Laid-Open No. 8-11190.

Referring to FIG. 1, the urethane-based thermoplastic elastomer composition is charged via the hopper (16) into the resin plasticizing cylinder (1) and is molten at its melting point or plasticizing temperature, or above. It is molten under heating at 120 to 240° C. Carbon dioxide in the liquefied carbon dioxide cylinder (4) is charged into the metering pump (5), and is increased in pressure therein. The pressure-controlled carbon dioxide is added into the molten urethane-based thermoplastic elastomer composition in the resin plasticizing cylinder (1). It is preferable to keep the system inside at least at the critical pressure of carbon dioxide (7.4 MPa) and at least at the critical temperature of carbon dioxide (31° C.), in order to greatly increase solubility of carbon dioxide in the molten urethane-based thermoplastic elastomer composition and allow it to dissolve or penetrate into the urethane-based thermoplastic elastomer composition in a short time.

It is also preferable to increase temperature and pressure of carbon dioxide to have the supercritical conditions, before it is incorporated in the molten urethane-based thermoplastic elastomer composition in the resin plasticizing cylinder (1).

The molten urethane-based thermoplastic elastomer composition is kneaded with carbon dioxide by the screw (17) in the resin plasticizing cylinder (1), to form the compatible state of urethane-based thermoplastic elastomer composition and carbon dioxide. Then, after compatibilizing, the molten urethane-based thermoplastic elastomer composition is cooled, while its temperature is controlled at the front end of the resin plasticizing cylinder (1), to not less than the plasticizing temperature of the molten urethane-based thermoplastic elastomer composition, not more than the temperature of 50° C. higher than that of the plasticizing temperature of the molten urethane-based thermoplastic elastomer composition, and, not more than the melting temperature adopted in the gas dissolving step. The temperature is in the range of 110 to 230° C., preferably 130 to 220° C., and not less than the plasticizing temperature of the molten urethane-based thermopalstic elastomer composition to cool, to regulate the viscosity suitable for the subsequent injection and foaming.

One embodiment of the present invention will be described in more detail by referring to the figures. The reference numerals in FIGS. 1 to 5 are (1): resin plasticizing cylinder, (2): injector, (3): mold, (4): liquefied carbon dioxide cylinder, (5): metering pump, (10): On-off valve, (11): injection plunger, (12): adaptor, (13): resin accumulator plunger, (14): resin accumulator, (15): in-line screw type injection molder, (16): hopper, (17): screw, (18): gas cylinder, (19): pressure regulator valve, and (20): on-off valve.

Carbon dioxide has the critical pressure of 7.4 MPa and critical temperature of 31° C. The resin plasticizing cylinder (1) inside is kept at 7.4 to 40 MPa, preferably 10 to 30 MPa, and at 110 to 300° C., preferably 130 to 280° C., still more preferably 240° C. or lower, particularly preferably 130 to 235° C.

Carbon dioxide as the foaming agent is preferably increased in temperature and pressure before being added in the molten urethane-based thermoplastic elastomer composition in the resin plasticizing cylinder (1), and then added after reaching the supercritical conditions.

The molten urethane-based thermoplastic elastomer composition is kneaded with carbon dioxide by the screw (17) in the resin plasticizing cylinder (1), to make the compatible state of the molten urethane-based thermoplastic elastomer composition and carbon dioxide. Then, after compatibilization, in the cooling step, the molten urethane-based thermoplastic elastomer composition is cooled, while its temperature is controlled at the front end of the resin plasticizing cylinder (1), to 110 to 230° C., preferably 130 to 220° C., and not less than the its plasticizing temperature of the molten urethane-based thermoplastic elastomer composition, and adjusted to have the viscosity suitable for the subsequent injection and foaming.

The molten urethane-based thermoplastic elastomer composition, after being temperature-controlled to have the viscosity suitable for the injection and foaming, is sent to the injector (2) equipped with the injection plunger (11), connected via the on-off valve (10), during the initial stage of the foaming controlling step. The molten urethane-based thermoplastic elastomer composition is metered by the retreat of the injection plunger (11), while the on-off valve (10) is open to allow the molten urethane-based thermoplastic elastomer composition to flow into the injector (2).

The common molder, whether it is of in-line screw type or plunger type, loses back pressure immediately after the metering is completed. However, it is necessary for the molder for the present invention to be designed in such a way to continue to control the pressure in the system with keeping a back pressure in the injector (2) until the injection is completed after the metering, to prevent the molten urethane-based thermoplastic elastomer composition from being separated into the foam and thermoplasstic elastomer composition, and to prevent the molten urethane-based thermoplastic elastomer composition from being foamed.

The back pressure level may be kept at minimum pressure prevents the molten urethane-based thermoplastic elastomer composition being separated into the foaming agent and urethane-based thermoplastic elastomer, and the molten urethane-based thermoplastic elastomer composition from being foamed. However, it is preferably kept at not less than the critical pressure of the carbon oxide. It is necessary to keep the pressure to prevent the molten urethane-based thermoplastic elastomer composition being separated into the urethane-based thermoplastic elastomer and gas until a series of the gas dissolving step, the cooling step and the metering step in the foaming controlling step are completed.

After completion of the metering in the foaming controlling step, the on-off valve (10) is switched closed, and the molten urethane-based thermoplastic elastomer composition is injected into the mold (3) by the injection plunger (11). The procedure of sucking back the injection plunger (11) after completion of the metering but before start of the injection to accelerate generation of the cell nuclei by slightly reducing the injector (2) pressure is also suitably used.

The mold (3) before injection is filled with a high-pressure gas at a given pressure charged from the gas cylinder (18) the metering pump (5) via the pressure regulator (19). For example, when nitrogen is used as the high pressure gas, it is preferably kept at not less than the critical pressure of carbon dioxide used as the foaming agent.

The molten urethane-based thermoplastic elastomer composition can be charged in the mold (3) without being foamed to have good surface appearances, when the mold (3) is filled with the high-pressure gas beforehand.

In the foaming controlling step, the molten urethane-based thermoplastic elastomer composition, being formed in the compatible state of the urethane-based thermoplastic elastomer and carbon dioxide, is injected into the mold (3) filled with the high-pressure gas. After the injection is completed, pressure in the mold (3) is rapidly reduced by rapidly releasing the high-pressure gas charged in the mold. This makes the impregnated gas in the urethane-based thermoplastic elastomer supersaturated, to generate a number of the cell nuclei therein.

As another suitable method for rapidly reducing pressure in the mold (3), after the molten urethane-based thermoplastic elastomer composition being formed in the compatible state of the urethane-based thermoplastic elastomer and carbon dioxide is injected into the mold (3), partly or totally the core is moved backwards, thereby capacity in the mold (3) is rapidly increased to rapidly reduce pressure in the mold (3). It is desired that the reduced amount of pressure is preferably in a range of 7.4 to 30 MPa, more preferably 7.4 to 25 MPa.

The expansion ratio can be adequately controlled by the temperature or pressure in the mold (3), or retreat of the core in the mold (3), to obtain the urethane-based thermoplastic elastomer composition foam of desired expansion ratio.

These methods for controlling foaming while reducing pressure in the mold can bring the sufficient foaming controlling effect, even when applied individually, and there is no problem when they are used together.

The method for producing the urethane-based thermoplastic elastomer composition foam by injection molding in the invention allows to incorporate a given quantity of carbon dioxide as the foaming agent in the molten urethane-based thermoplastic elastomer composition constantly and stably. Therefore, the molten urethane-based thermoplastic elastomer composition in the resin plasticizing cylinder (1), added and well kneaded with carbon dioxide, can be injected by the injector (2) for molding after metered, while being constantly exposed to a back pressure. As a result, it can easily form the molten urethane-based thermoplastic elastomer composition in the compatible state and easily keep the compatible step of the molten urethane-based thermoplastic elastomer composition, to give the urethane-thermoplastic elastomer composition having good surface appearances being a product from a low foamed product to a high foamed product with stable quality.

It is preferable to use the production system adopting the same conditions as those of the production method described earlier, in order to produce the urethane-based thermoplastic elastomer composition foam of the present invention.

<Examples of the Method of Producing the Laminates of the Urethane-based Thermoplastic Elastomer Foam>

In the present invention, it is possible to produce the laminate of the foamed urethane-based thermoplastic elastomer (the urethane-based thermoplastic elastomer foam) in which the urethane-based thermoplastic elastomer is laminated with a thermoplastic resin structure.

In this specification, the thermoplastic resin structures means all types of molded articles, including foamed articles, fiber-reinforced foamed articles, laminates of long fibers, non-foamed injection-molded articles and non-foamed extruded articles, produced by known resin molding processes, e.g., injection molding, extrusion molding, blow molding, press molding, rotational molding and injection-compression molding.

One of the examples of producing the urethane-based thermoplastic elastomer foam will be described below.

The mold (3) is opened before injecting molten urethane-based thermoplastic elastomer composition into the mold (3), to set the thermoplastic resin structure in the cavity in the mold (3). Then, after setting, the mold (3) is closed, and optionally filled with a high-pressure gas. Then, the thermoplastic resin structure is laminated with the urethane-based thermoplastic elastomer foam, to produce the laminate of the urethane-based thermoplastic elastomer foam by the method for producing the urethane-based thermoplastic elastomer foam of the invention described earlier.

Other than the method for setting the thermoplastic resin structure in the cavity in the mold (3) following the open-close procedure of the mold, it is preferably used for the method that the thermoplastic resin structure is formed in the mold (3) by a double injection molder or the like, and the thermoplastic resin structure is laminated with the urethane-based thermoplastic elastomer foam by the method for producing the urethane-based thermoplastic elastomer foam of the invention, to produce the laminate of the urethane-based thermoplastic elastomer foam.

Figure 6:
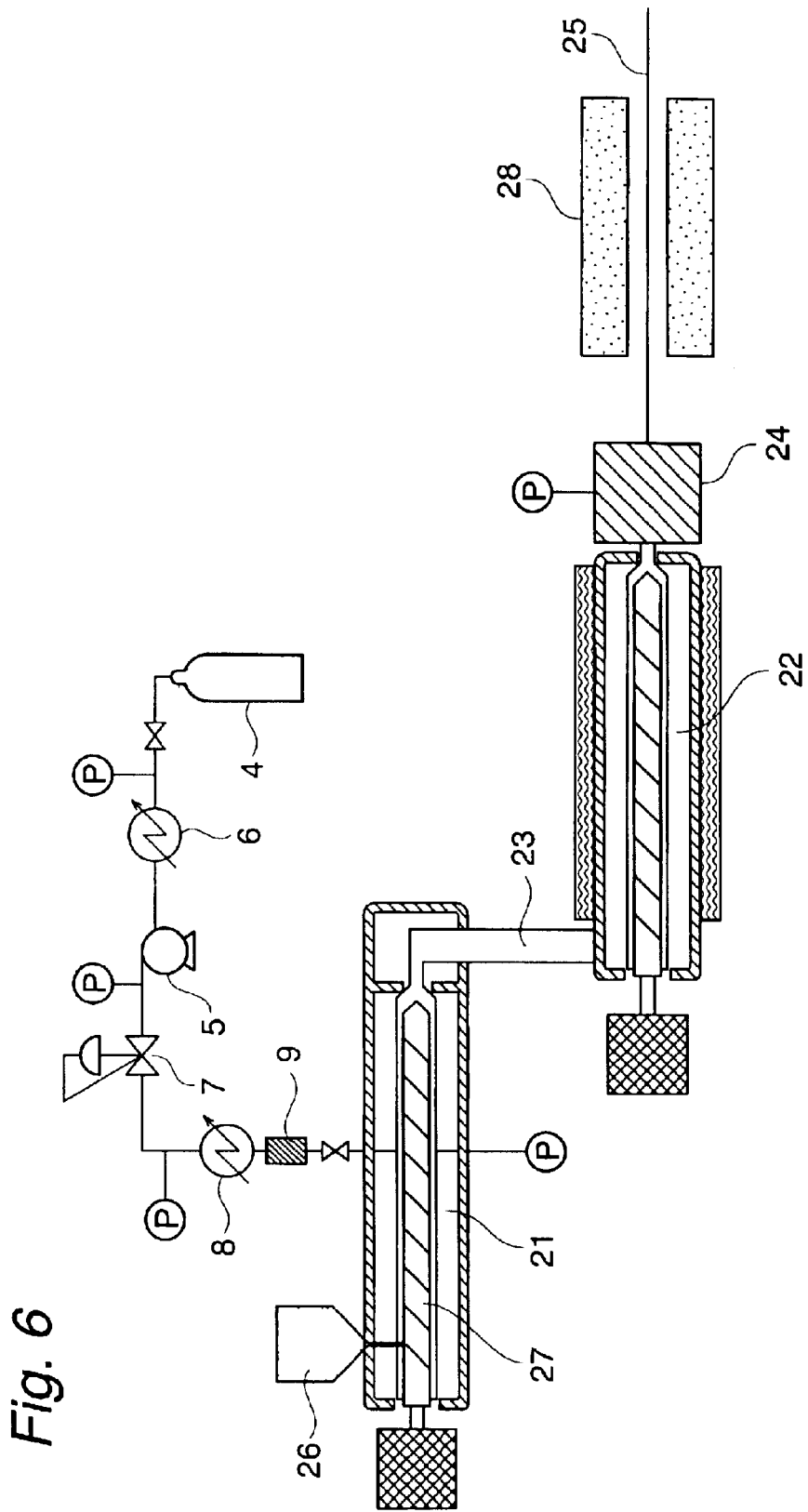
FIG. 6 schematically shows the structure of still another example of the method of the present invention for producing a urethane-based thermoplastic elastomer foam.

One embodiment involving extrusion molding will be described by referring to the figures. Referring to FIG. 6, (4) is a liquefied carbon dioxide cylinder, (5) is a metering pump, (6) is a refrigerant circulator, (7) is a pressure regulator, (8) is a heater, (9) is a flow meter, (21) is the first extruder, (22) is the second extruder, (23) is a connection, (24) is a die, (25) is a foam, (26) is a hopper, (27) is a screw, and (28) is a cooler.

The urethane-based thermoplastic elastomer is charged in the first extruder (21), which serves as the inlet-side for the continuous plasticator and which is equipped with the line-for adding the foaming agent to the molten urethane-based thermoplastic elastomer, and the urethane-based thermoplastic elastomer is incorporated with carbon dioxide, while being molten under heating, to form the molten urethane-based thermoplastic elastomer composition in the molten state of urethane-based thermoplastic elastomer and foaming agent.

There is the method for adding the foaming agent to the molten urethane-based thermoplastic elastomer in the continuous plasticator, such as the method of injecting gaseous carbon dioxide directly or after being pressurized, the method of adding liquefied carbon dioxide by a plunger pump or the like. One of the methods suitably used is that carbon dioxide is charged in the metering pump (5) from the liquefied carbon dioxide cylinder (4) or the like, while being kept in the liquid state, discharged from the pump (5) after being pressurized in a constant pressure of the critical pressure of carbon dioxide (7.4 MPa) to 40 Mpa while controlled by the pressure regulator (7), and heated to the critical temperature of carbon dioxide (31° C.) or higher, to form the supercritical carbon dioxide, and then it is added to the molten urethane-based thermoplastic elastomer.

The molten urethane-based thermoplastic elastomer composition is then transferred to the second extruder (22) serving as the outlet-side for the continuous plasticator, and the temperature is slowly lowered to the optimum temperature level for foaming, and at this time, the conditions of pressure and temperature at the front end of the second extruder (22) is preferably under supercritical conditions at not less than critical pressure of carbon dioxide and not less than critical temperature of carbon dioxide.

An adaptor having a mixing zone is preferably attached at the connection (23) between the first extruder (21) and second extruder (22). It further accelerates a mixing of the molten urethane-based thermoplastic elastomer and carbon dioxide, facilitates to foam the compatible state of the molten urethane-based thermoplastic elastomer and carbon dioxide, and to cool the molten urethane-based thermoplastic elastomer composition to have a viscosity suitable for the subsequent foaming by controlling the temperature by the adapter.

The kinds of adapter having a mixing zone is not limited. It is, however, preferably to use the adapter equipped with a built-in static mixer which can knead and cool the molten urethane-based thermoplastic elastomer composition.

However, it is not needed to use the tandem type foaming extruder system which includes the second extruder (22) for the continuous plasticator, but to use a single extruder system when in the first extruder (21), the compatible state of the molten urethane-based thermoplastic elastomer composition can be sufficiently formed, and said molten urethane-based thermoplastic elastomer composition can be cooled to the optimum foaming temperature level.

Then, the molten urethane-based thermoplastic elastomer composition controlled at the optimum foaming temperature is transferred to the die (24) connected to the continuous plasticator at its front end, and pressure is reduced to start foaming.

In the method for producing the laminate of the urethane-based thermoplastic elastomer composition foam by extrusion molding of the invention, the urethane-based thermoplastic elastomer is molten under heating, incorporated and uniformly mixed with carbon dioxide in the first extruder (21) serving as the inlet-side for the continuous plasticator, at the dissolving step which forms the compatible state of the urethane-based thermoplastic elastomer and carbon dioxide. In the cooling step, the molten urethane-based thermoplastic elastomer composition is cooled to have a viscosity suitable for foaming at the outlet side of the continuous plasticator.

In the foaming controlling step, in the die (24) where the molten urethane-based thermoplastic elastomer composition is located, the pressure is reduced to not more than the critical pressure of carbon dioxide. This makes carbon dioxide supersaturated, to generate a number of the cell nuclei in the molten urethane-based thermoplastic elastomer composition being supersaturated. Then, the foam (25) is rapidly cooled to not more than the crystallization temperature of the urethane-based thermoplastic elastomer, and the growth of the cells generated is controlled to control the desired expansion ratio.

Of these steps, at least the gas dissolving step and cooling step can be carried out in accordance with the following methods disclosed claims and examples of Japanese Patent Laid-Open No. 8-11190.

Referring to FIG. 6, the urethane-based thermoplastic elastomer is charged via the hopper (26) in the first extruder (21) serving as the inlet-side for the continuous plasticator, where the urethane-based thermoplastic elastomer is molten at not less than plasticizing temperature of the urethane-based thermoplastic elastomer, generally at 100° C. or higher, preferably 110° C. or higher, more preferably 150 to 240° C., particularly preferably 160 to 230° C. Carbon dioxide in the liquefied carbon dioxide cylinder (4) is charged in the metering pump (5) to be pressurized, and the carbon dioxide whose pressure is controlled is added in the molten urethane-based thermoplastic elastomer in the first extruder (21).

In the inside of the system, it is preferably to keep at not less than critical pressure of carbon dioxide and not less than critical temperature carbon dioxide, because the carbon dioxide added in the first extruder (21) allows to greatly increase solubility diffusivity to the molten urethane-based thermoplastic elastomer to enable the carbon dioxide to quickly penetrate into the urethane-based thermoplastic elastomer.

Carbon dioxide to be charged in the first extruder (21) may be added after the supercritical conditions following a heat up and a pressurizing.

The molten urethane-based thermoplastic elastomer and carbon dioxide are kneaded by the screw (27) in the first extruder (21), to form compatible state of the urethane-based thermoplastic elastomer and carbon dioxide.

After the compatibilization, the molten urethane-based thermoplastic elastomer composition is cooled in the cooling step, while the temperature is controlled at the front end of the second extruder (22) serving as the outlet-side for the continuous plasticator, to a temperature of at not less than the plasticizing temperature of the molten urethane-based thermoplastic elastomer composition, not more than the temperature of 50° C. higher than the plasticizing temperature of the molten urethane-based thermoplastic elastomer composition, and not more than the melting temperature in the gas dissolving step. The temperature is in a range of 50 to 230° C., preferably 80 to 220° C., and at not less than the plasticizing temperature of the molten urethane-based thermoplastic elastomer composition, to be adjusted to have the viscosity suitable for the subsequent foaming.

One embodiment of the method for producing foam sheets by the method for producing the urethane-based thermoplstic elastomer composition foam of the invention is described in detail by referring to the figures. In this embodiment, the example of using a circular die is described; however, a T-die, such as coat hanger die or fish-tail die also can be employed.

Figure 7:
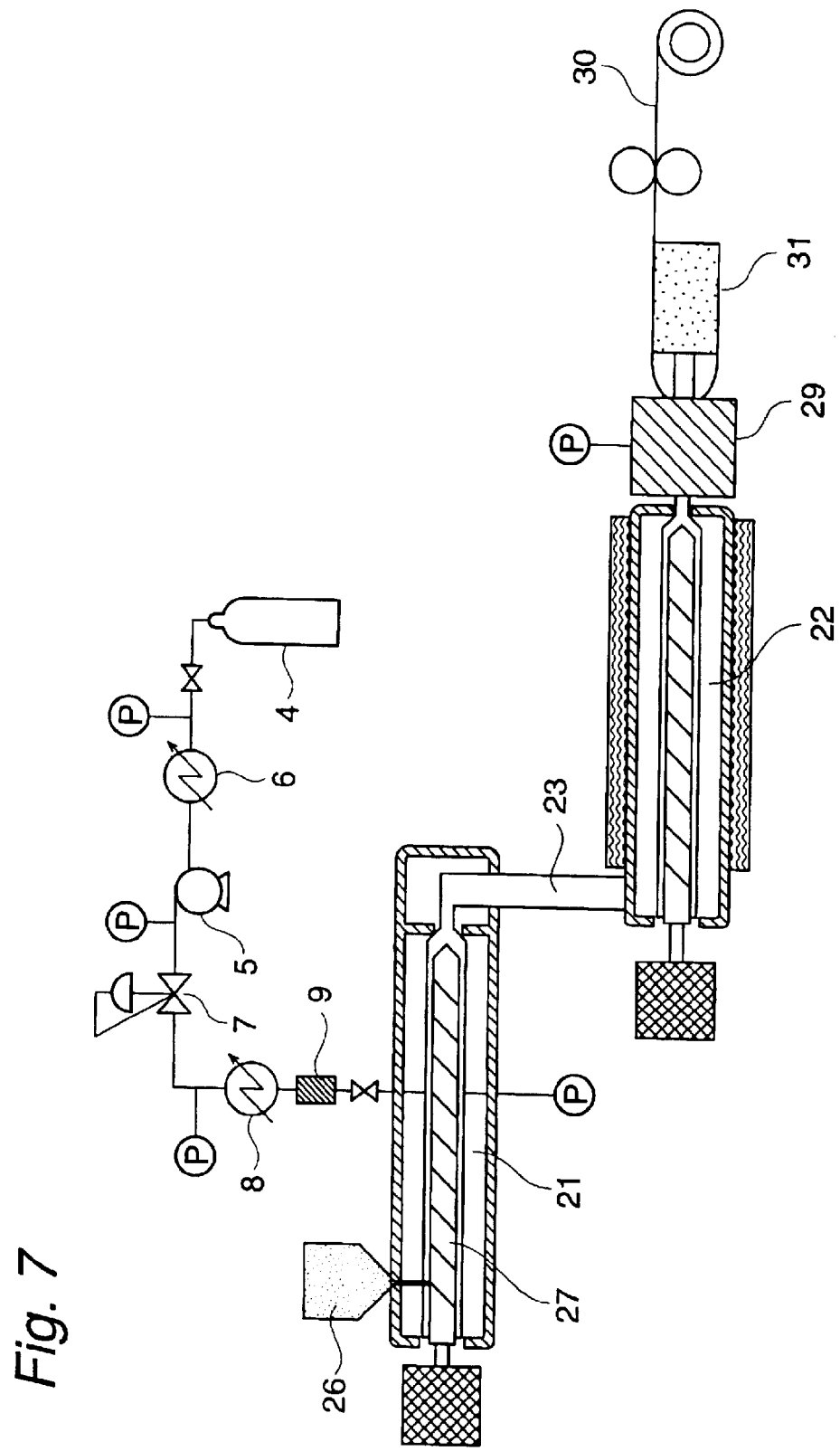
FIG. 7 schematically shows the structure of one example of the method for continuously producing foamed sheets by the method of the present invention for producing a urethane-based thermoplastic elastomer foam.

Referring to FIG. 7, (4) is a liquefied carbon dioxide cylinder, (5) is a metering pump, (6) is a refrigerant circulator, (7) is a pressure regulator, (8) is a heater, (9) is a flow meter, (21) is the first extruder, (22) is the second extruder, (23) is a connection, (26) is a hopper, (27) is a screw, (29) is a circular die, (30) is a foamed sheet, and (31) is a water-cooled mandrel.

Referring to FIG. 7, in the gas dissolving step, 100 parts by weight of the urethane-based thermoplastic elastomer composition is charged via the hopper (26) in the first extruder (21) serving as the inlet-side for the continuous plasticator and molten under heating. Carbon dioxide in the liquefied carbon dioxide cylinder (4) is charged in the metering pump (5), while being temperature-controlled, to be pressurized there, and 0.1 to 20 parts by weight of the pressure-controlled carbon dioxide is added to the molten urethane-based thermoplastic elastomer composition in the first extruder (21) for the gas dissolving step.

In the inside of the system, it is preferably kept at not less than critical pressure of carbon dioxide and not less than critical temperature of carbon dioxide, to make possible that the carbon dioxide added in the first extrude (21) allows to greatly increase solubility diffusivity to the molten urethane-based thermoplastic elastomer to enable the carbon dioxide to quickly penetrate into the urethane-based thermoplastic elastomer.

Carbon dioxide has the critical pressure of 7.4 MPa and critical temperature of 31° C. The first extruder (21) inside is kept at pressure in the range of 7.4 to 40 MPa, preferably 10 to 30 MPa, and at temperature in the range of generally 100° C. or higher, preferably 110° C. or higher, more preferably 150 to 300° C., particularly preferably 160 to 280°C., and the upper limit of temperature is desirably 230° C. or lower.

Carbon dioxide to be added to the molten urethane-based thermoplastic elastomer in the first exturder (21) may be added after the supercritical conditions following a heat-up and pressurizing.

The molten urethane-based thermoplastic elastomer and carbon dioxide are kneaded by the screw (27) in the first extruder (21), to form the compatible state of the urethane-based thermoplastic elastomer and carbon dioxide.

After the compatibilization, the molten urethane-based thermoplastic elastomer composition is transferred to the second extruder (22) serving as the outlet-side for the continuous plasticator to cool in a suitable temperature for foaming in the cooling step, in order to increase solubility of carbon dioxide in the urethane-based thermoplastic elastomer.

The temperature is in a range of 110 to 230° C., preferably 130 to 220° C., and control to cool not less than the plasticizing temperature of the molten urethane-based thermoplastic elastomer composition, to be adjusted to have the viscosity suitable for the subsequent foaming.

The cooling step using the second extruder (22) is the step to reasonably approach the temperature condition suitable for foaming. Sufficiently cooling in this step facilitates continuous, stable production of the urethane-based thermoplastic elastomer foam. However, the second extruder (22) serving as the outlet-side for the plasticator may not be needed to connect, and the foam can be produced with a single extruder, when the apparatus, by which the first extruder (21) as the continuous plsticator alone can sufficiently cool the molten urethane-based thermoplastic elastomer composition to the temperature level suitable for foaming, is employed.

It is more preferable to connect a kneading device, such as static mixer, to the connection (23) between the first extruder (21) and second extruder (22), to improve the solubility of carbon dioxide in the molten urethane-based thermoplastic elastomer composition.

In the subsequent foaming controlling step, the molten urethane-based thermoplastic elastomer composition is transferred to the circular die (29), which is set at the optimum foaming temperature and connected to the outlet-side for the continuous plasticator, and the foaming is started. Carbon dioxide is made supersaturated by reducing a pressure at the circular die (29) outlet under controlled conditions.

The molten urethane-based thermoplastic elastomer composition supersaturated with carbon dioxide, being thermally unstable, generates a number of the cells. It is known that glass transition temperature of a gas-containing resin generally decreases in proportion to gas-containing content, and the temperature inside the circular die (29) is preferably at not less than the glass transition temperature of the molten urethane-based thermoplastic elastomer composition.

The molten urethane-based thermoplastic elastomer composition, after starting foaming, is discharged from the circular die (29) outlet.

The molten urethane-based thermoplastic elastomer composition discharged from the circular die (29) starts foaming at the same time of discharging. The resultant foam is put over the water-cooled mandrel (31) provided in front of the circular die (29) to be formed into a cylindrical shape, and the foam formed in a cylindrical shape is run over the water-cooled mandrel (31) while cooling, and then cut by a cutter blade into the foamed sheet (30) of the urethane-based thermoplastic elastomer.

In the present invention, it is necessary to prevent molten the urethane-based thermoplastic elastomer composition from separating into the urethane-based thermoplastic elastomer and carbon dioxide until the gas dissolving step and cooling step are completed. For this, the pressure is preferably kept at not less than critical pressure of carbon dioxide.

In the method for producing the urethane-based thermoplastic elastomer composition foam by the extrusion molding of the invention, the molten urethane-based thermoplastic elastomer composition is incorporated with carbon dioxide in the first extruder (21) serving as the inlet-side for the continuous plasticator, well kneaded, and the compatible state between urethane-based thermoplastic elastomer composition and carbon dioxide is formed. After that, a temperature at the outlet-side for the continuous palsticator of the molten urethane-based thermoplastic elastomer composition is lowered, and foaming is started by lowering a pressure, and the expansion ratio is controlled by the cooler (28), to continuously produce the urethane-based thermoplastic elastomer composition foam of stable quality over a wide range of foam of from low ratio of around 1 to 4 to high ratio of around 4 to 50.

In order to produce the urethane-based thermoplastic elastomer composition foam, it is recommended to use the production apparatus which operates under the same conditions as those adopted by the production method of the present invention described earlier.

In case of adopting the injection molding, it is possible to foam the urethane-based thermoplastic elastomer (A-1) by itself. When the urethane-based thermoplastic elastomer (A-1) is mixed with the other thermoplastic elastomer (A-2), the ratio ((A-1)/(A-2)) can be voluntarily set in accordance with specific applications and purposes.

Applications of the Urethane-based Thermoplastic Elastomer Composition Foam

The urethane-based thermoplastic elastomer composition foam produced by the method for producing the urethane-based thermoplastic elastomer composition foam of the present. invention is not limited in production shape, and it can be applied for a variety of molded product.

The applications of the urethane-based thermoplastic elastomer composition foam include instrument panel faces, door faces, linings for the instrument panel face and door face, door trims, pillars, console boxes, steering wheels, gear levers, air boxes, dashboards, replaceable seats, deaf garnishes, curl top garnishes, ceiling materials, weather strip sponges and the like;

vehicle parts, such as trunk room linings, engine room linings, bumpers, fenders, hood faces, side shields and cushions and the like;

two-wheel vehicle parts, such as handlebars, helmet linings, seats and racing suit faces;

parts and products for OA devices, such as cases for: mice, key boards, OA housings, headphones, calculators, telephone receivers, PHS or cellular phones: mouse pads, and desk mats and the like;

and miscellaneous goods, such as packing materials for recording medium disks (e.g., for MO's, CD-ROM's, DVD's and the like), system pocketbooks, wallets, notebooks, files, bags, toilet seats, pencils, ball-point pens, fountain pens, carpets, Japanese sandals, wooden clogs, slippers, kitchen knives and scissors grips, shoe soles, shoes, such as sandals, and the like;

electric device parts, such as wire coatings, connectors, caps, plugs and the like;

civil engineering materials, such as water-stopping plates, sealing sponges, ski mats, sound-insulating walls and the like;

leisure goods, such as golf club grips, golf balls, baseball bat grips, tennis racket grips, swimming fins, goggles and the like; and miscellaneous goods, such as sanitary products (e.g., paper diapers), porous film sheets, synthetic leather, agricultural films, vibration damping and sound insulating sheets, gaskets, waterproof cloth, garden hoses, belts and the like; industrial packings and the like.

EXAMPLES

The present invention will be described by Examples, which by no means limit the present invention.
(Property Evaluation Methods)

The properties in Examples and Comparative Examples were evaluated by the following methods.

1) Surface Appearances

The foamed sheet surface was visually observed, and evaluated by the following standards, A: the surface of the foam is even and uniform, B: the surface of the foam shows roughened cells due to breaking of the foams, and C: the surface shows notable defects, such as blisters. The foam was passed, when marked with "A."

2) Expansion Ratio

The urethane-based thermoplastic elastomer foam sheet or foam was continuously prepared, and the 3 samples were collected at intervals of 10 minutes. Each sample was cut into the test piece, 30 mm×30 mm in area, and measured for its density by an electronic density meter. The ratio of the densities of the 3 pieces to the density of the urethane-based thermoplastic elastomer as the starting material was defined as the expansion ratio, where the value was rounded off to two decimal places.

3) Flexibility

Flexibility of each sample was evaluated by the following standards, A: the sample is soft and like rubber sponge to the touch, C: the sample is hard like a non-foamed resin, and the three grades A⁻, B and B⁻ in-between A and C by extent. The sample was passed, when marked with "A" or "A⁻."

4) Heat Resistance

The temperature at which the sample lost its weight by 5% was measured by TG-DTA. The heat resistance was evaluated by the following standards, A: the temperature is 280° C. or higher, B: the temperature is not less than 260° C. and less than 280° C., and C: the temperature is less than 260° C. The sample was passed, when marked with "A" or "B."

5) Average Cell Diameter

The urethane-based thermoplastic elastomer foamed sheet or foam was continuously prepared, and the 3 samples were collected at intervals of 10 minutes. The cross sections of these 3 samples were photographed by a scanning electron microscope.

Each photograph of each cross section was image-processed, and the cells in the 500 $\mu$m square area were measured for the circle-equivalent diameter, to find the average circle-equivalent diameter. The average value of diameters of the 3 samples was defined as the average cell diameter.

6) Cell Uniformity

Cell uniformity was evaluated for each of the 3 samples by the largest circle-equivalent diameters in the 500 $\mu$m square area in the photographs of cross sections of foam sheet photograhed by the scanning electron microgram. The evaluation standards are A: the largest circle-equivalent diameter is 1.5 times or less of the average circle-equivalent diameter, and the average circle-equivalent diameter of the 3 samples is $\frac{2}{3}$ to 1.5 times of the average cell diameter, B: the largest circle-equivalent diameter is 2 times or less of the average circle circle-equivalent diameter, and the average circle-equivalent diameter of the 3 samples is ½ to 2 times of the average cell diameter, and C: the largest circle-equivalent diameter and the average equivalent diameter of the 3 samples exceed those marked with "B." The sample was passed, when marked with "A" or "B."

7) Stability of Quality

Stability of quality was evaluated with respect to the surface appearances and cell uniformity according to the following standards, A: both surface appearances and cell uniformity are given "A," B: both surface appearances and cell uniformity are given "B" or higher, and C: none of the above. Stability of quality was also evaluated by the following standards, A: roughened cells are not observed, B: roughened cells are observed very slightly, and C: roughened cells are observed slightly.

8) Elongation Set

The elongation set was determined in accordance with JIS K-6301-3, where the sample was held at an elongation of 200% for 10 minutes, and the elongation observed 10 minutes after the load was removed was defined as the elongation set. The elongation set should be 50% or less, preferably 0.5 to 40%, more preferably 0.5 to 30% or less.

9) Gel Content (Chloroform-Insolubles)

The sample of the urethane-based thermoplastic elastomer foamed composition was cut into the pieces, 0.5 mm×0.5 mm×0.5 mm in size. 500 mg of the piece sample was wrapped by a 300-mesh wire net (100 mm×100 mm), sealed by staples, and weighed again. The sample protected by the wire net was put in a 300 ml flask, to which approximately 200 ml of chloroform was added. It was dissolved under heating for approximately 5 hours with stirring lightly on a hot plate equipped with a stirrer. The sample-containing net was withdrawn from the flask, and dried for approximately 5 hours at 100° C. by a vacuum drier. It was cooled to room temperature, and weighed. The gel fraction is determined by the following formula:

Gel fraction=[weight of the insoluble TPU/weight of the sample]×100

The gel fraction should be normally 10 to 98 parts by weight, preferably 20 to 98 parts by weight. A smaller gel fraction means a larger chloroform-soluble quantity, considered to result from the presence of the oligomers and low-molecular-weight compounds from the TPU composition, produced by the thermal decomposition, which is an undesirable phenomenon.

10) Bulk Density

The bulk density was determined by the water displacement method, in accordance with JIS K-7112.

Example 1

In Example 1, the apparatus shown in FIG. 1 in this specification was used. The carbon dioxide supply part was provided at around the center of the resin plasticizing cylinder (1). The urethane-based thermoplastic elastomer used was Pellethane 2103-9OAEL (Dow Chemical's trade name), which was dried at 110° C. for 4 hours. It had a melt flow rate of 0.7 g/10 minutes (determined in accordance with ASTM D-1238-65T at 190° C. and a load of 2.16 kg), melting temperature of 166° C. (determined by DSC), crystallization heat of 11.6 J/g, and contained 0.095 mmol/g of the allophanate group (determined by the back titration, based on the amine decomposition method). This elastomer may be hereinafter referred to as TPU-1.

The urethane-based thermoplastic elastomer was charged, via the hopper (16), in the resin plasticizing cylinder (1), where it was molten under heating at 230° C.

Carbon dioxide was contained in a siphon type liquefied carbon dioxide cylinder (4), from which carbon dioxide could be directly taken from the liquid phase. The line from the liquefied carbon dioxide cylinder (4) to the metering pump (plunger pump) (5) was cooled by the refrigerant circulator (6) with an aqueous solution of ethylene glycol kept at −12° C., and the system was designed to charge the liquefied carbon dioxide to the plunger pump (5). The plunger pump (5) was controlled so that the liquefied carbon dioxide discharged was at 1 part by weight per 100 parts by weight of the urethane-based thermoplastic elastomer, where the discharge pressure of the plunger pump (5) was controlled at 30 MPa by the pressure regulator (7). The line was heated by the heater (8) at 50° C., and the carbon dioxide was added in the molten urethane-based thermoplastic elastomer in the resin plasticizing cylinder (1) from the pressure regulator (7) to the carbon dioxide supplying part of the resin plasticizing cylinder (1). The pressure of molten resin at the supplying part was at 20 MPa. In other words, carbon dioxide was under the supercritical conditions, kept at 50° C. or higher and 20 MPa, just before it was dissolved in the molten urethane-based thermoplastic elastomer.

Thus, the carbon dioxide was added to the completely molten urethane-based thermoplastic elastomer. The molten urethane-based thermoplastic elastomer and carbon dioxide were kneaded and dissolved in each other in the resin plasticizing cylinder (1), and the resultant molten urethane-based thermoplastic elastomer composition was gradually cooled to 160° C., metered by the injector (2) kept at 160° C. and injected into the mold (3) kept at 40° C. The mold (3) immediately before injection was filled with nitrogen gas under a pressure of 8 Mpa. On completion of the injection, nitrogen gas was released out of the mold (3) in 1 second, and the mold (3) core of cavity measurements of 60 mm×60 mm in area and 2 mm in thickness was moved backwards by 2 mm to have the expansion ratio of around 2. As a result, the plate, 60 mm×60 mm×4 mm in size, as the urethane-based thermoplastic elastomer foam was obtained.

The evaluation results of the obtained foam are given in Table 1. It was the foam excellent in flexibility, heat resistance and surface appearances.

Example 2

The foam was obtained in the same manner as in Example 1, except that the urethane-based thermoplastic elastomer was replaced by Pellethane 2355-80AE (Dow Chemical's trade name) having a melt flow rate of 2.7 g/10 minutes (determined in accordance with ASTM D-1238-65T at 190° C. and a load of 2.16 kg) and crystallization heat of 10.8 J/g (this elastomer maybe hereinafter referred to as TPU-2) was used at 100 parts by weight and liquefied carbon dioxide at 2 parts by weight.

The evaluation results of the obtained foam are given in Table 1. It was the foam excellent in flexibility, heat resistance and surface appearances.

Comparative Examples 1 and 2

The foam was obtained for each of Comparative Examples 1 and 2 in the same manner as in Example 1, except that the ratio of the thermoplastic elastomer to carbon dioxide was changed to the one given in Table 1.

The evaluation results of the foam are given in Table 2. The foam which the present invention intends could not be produced, because it was not desirable in that it had defective surface appearances and unsatisfactory expansion ratio.

Comparative Example 3

The foam was obtained in the same manner as in Example 1, except that carbon dioxide was replaced by 2 parts by weight of azodicarbon amide as the foaming agent, and the cylinder temperature was changed to 200° C. to generate the gas by decomposing azodicarbon amide.

The evaluation results of the obtained foam are given in Table 2. The foam which the present invention intends could not be produced, because it had uneven cell diameters and defective surface appearances.

Comparative Example 4

The foam was obtained in the same manner as in Example 2, except that carbon dioxide was replaced by 2parts by weight of azodicarbon amide as the foaming agent, and the cylinder temperature was changed to 200° C. to generate the gas by decomposing azodicarbon amide.

The evaluation results of the obtained foam are given in Table 2. The foam which the present invention intends could not be produced, because it had uneven cell diameters and defective surface appearances.

Example 3

The foam was obtained in the same manner as in Example 1, except that the urethane-based thermoplastic elastomer was replaced by Pellethane 2363-80AE (Dow Chemical's trade name) having a melt flow rate of 4. 1 g/10 minutes (determined in accordance with ASTM D-1238-65T at 190° C. and a load of 2.16 kg) and crystallization heat of 7.3 J/g (this elastomer may be hereinafter referred to as TPU-3), which was used with liquefied carbon dioxide at 3 parts by weight per the TPU-3.

The plate of the urethane-based thermoplastic elastomer foam (60×60×12 mm in size) was obtained in the same manner as in Example 1, except that the core in the mold (3) was moved back by 10 mm and expansion ratio was set at around 6.

The evaluation results of the obtained foam are given in Table 1. It was the foam excellent in flexibility, heat resistance and surface appearances.

Example 4

The foam was obtained in the same manner as in Example 1, except that the urethane-based thermoplastic elastomer was replaced by Pellethane 2102-80A (Dow Chemical's trade name) having a melt flow rate of 1.6 g/10 minutes (determined in accordance with ASTM D-1238-65T at 190° C. and a load of 2.16 kg) and crystallization heat of 9.7J/g (this elastomer may be hereinafter referred to as TPU-4), was used at 100 parts by weight and liquefied carbon dioxide at 2 parts by weight.

The plate of the urethane-based thermoplastic elastomer foam (60×60×6 mm in size) was obtained in the same manner as in Example 1, except that the core in the mold (3) was moved back by 4 mm and expansion ratio was set at around 3.

The evaluation results of the obtained foam are given in Table 1. It was the foam excellent in flexibility, heat resistance and surface appearances.

Comparative Example 5

The plate (60×60×10 mm in size) of the foam was obtained in the same manner as in Example 3, except that 3 parts by weight of butane gas was used as the foaming agent.

The evaluation results of the obtained foam are given in Table 2. The foam which the present invention intends could not be produced, because it had insufficient heat resistance although exhibiting good flexibility.

Comparative Example 6

The plate (60×60×10 mm in size) of the foam was obtained in the same manner as in Example 4, except that 3 parts by weight of butane gas was used as the foaming agent.

The evaluation results of the foam are given in Table 2. The foam which the present invention intends could not be produced, because it had insufficient flexibility although exhibiting good heat resistance.

Comparative Example 7

The plate (60×60×10 mm in size) of the foam was obtained in the same manner as in Example 2, except that 3 parts by weight of butane gas was used as the foaming agent.

The evaluation results of the obtained foam are given in Table 2. The foam which the present invention intends could not be produced, because it had insufficient flexibility although exhibiting good heat resistance.

Examples 5 to 7

The foam was obtained in each of Examples 5 to 7 in the same manner as in Example 2, except that the urethane-based thermoplastic elastomer was replaced by Pellethane 2355-80AEL and Pellethane 2355-80AE having a melt flow rate of 0.7 and 2.7 g/10 minutes, respectively (determined in accordance with ASTM D-1238-65T at 190° C. and a load of 2.16 kg) in a ratio given in Table 1, which were incorporated with carbon dioxide at 5 parts by weight.

The evaluation results of the obtained foam are given in Table 1. It was the foam excellent in flexibility, heat resistance and surface appearances.

Examples 8 to 16

In Examples 8 to 16, the apparatus shown in FIG. 7 in this specification was used. A tandem type extruder with the first extruder (21) (screw diameter: 50 mm) and the second extruder (22) (screw diameter: 65 mm) were used as the continuous plasticizing apparatus, wherein the circular die (29) (outlet gap: 0.5 mm, diameter: 80 mm) was connected to the second extruder (22) at the front end, and the water-cooled mandrel (31) (diameter: 200 mm) was used as the cooler. The first extruder (21) was rotated at 40 rpm. The thermoplastic resin composition was extruded at around 10 kg/hour.

The carbon dioxide supply part was set at around the center of the first extruder (21).

The urethane-based thermoplastic elastomer used was TPU-1, as the same as that of Example 1. TPU-1 was charged, via the hopper (26), in the first extruder (21), where it was molten under heating at 220° C.

Carbon dioxide was contained in a siphon type liquefied carbon dioxide cylinder (4), from which carbon dioxide could be directly taken from the liquid phase. The line from the liquefied carbon dioxide cylinder (4) to the plunger pump (5) was cooled by the refrigerant circulator (6) with an aqueous solution of ethylene glycol kept at −12° C., and the system was designed to charge the liquefied carbon dioxide to the plunger pump (5). The plunger pump (5) was controlled so that the liquefied carbon dioxide was at 1 kg/hour, where the discharge pressure of the plunger pump (5) was controlled at 30 MPa by the pressure regulator (7). Volumetric efficiency of the plunger pump (5) was constant at 65%. The line from the pressure regulator (7) to the carbon dioxide supplying part of the first extruder (21) was heated by the heater (8) at 50° C., and the carbon dioxide was added in the molten urethane-based thermoplastic elastomer in the first extruder (21). The pressure of molten resin at the supplying part was at 20 MPa. In other words, carbon dioxide was under the supercritical conditions, kept at 50° C. or higher and 20 MPa, immediately before it was dissolved in the molten urethane-based thermoplastic elastomer.

One part by weight of the supercritical carbon dioxide was added in the first extruder (21), while metering by the flow meter (9), per 100 parts by weight of the molten urethane-based thermoplastic elastomer, where they were uniformly mixed with each other by the screw (27). The resultant molten urethane-based thermoplastic elastomer was sent to the second extruder (22), where the resin temperature was adjusted at 200° C., and extruded from the circular die (29) at an extruding amount of 10 kg/hour. The die inside was kept at 8 MPa. The urethane-based thermoplastic elastomer extruded was foamed at the same time after extruding from the circular die (29), and then was put over the water-cooled mandrel (31) provided in front of the circular die (29). The urethane-based thermoplstic elastomer foam formed into a cylindrical shape was run while cooling over the mandrel (31), and developed by a cutter blade into the urethane-based thermoplastic elastomer foamed sheet (30). Obtained the urethane-based thermoplastic elastomer foamed sheet was 63 mm wide and 1.5 mm thick, and had elegant appearances.

The evaluation results of the obtained foamed sheet are given in Tables 1, 3 and 4. It was the foam excellent in flexibility, heat resistance and surface appearances.

Comparative Example 8

The foam was obtained in the same manner as in Example 8, except that the ratio of the thermoplastic elastomer to carbon dioxide was set at the ratio given in Table 2.

The evaluation results of the obtained foam are given in Table 2. The foam which the present invention intends could not be produced, because it was not desirable in that it had an unsatisfactory expansion ratio, and insufficient flexibility and poor quality stability.

Reference Example 1

Example of Foaming the TPU Sheet by the Batch Method

The pelletized Pellethane 2103-90AEL was formed by hot-pressed machine into the sheet, 1 mm thick and 100×100 mm in size beforehand. The sheet was put in a 300 cc autoclave, to which supercritical carbon dioxide, kept at 40° C. and pressurized at 15 MP, was added, and then was held in the autoclave for 3 hours, to penetrate the carbon dioxide into the polymer. Then, the pressure was released, to prepare the foam. The foamed TPU sheet had a DSC-determined heat of fusion and heat of crystallization on an even level with, or slightly lower than, those of the pelletized TPU before foaming.

It is considered, when the TPU is foamed and molded in an extruder with supercritical carbon dioxide, that its melting point Tm increases, because of its tendency to the molecular orientation and to agglomerate the hard segments. On the other hand, this effect is reduced in the batch process, because of foaming to extent of isotropic direction.

TABLE 1

|  | Examples | | | | | | | |
|---|---|---|---|---|---|---|---|---|
|  | 1 | 2 | 3 | 4 | 5 | 6 | 7 | 8 |
| TPU-1 | 100 | — | — | — | 70 | 50 | 30 | — |
| TPU-2 | — | 100 | — | — | 30 | 50 | 70 | 100 |
| TPU-3 | — | — | 100 | — | — | — | — | — |
| TPU-4 | — | — | — | 100 | — | — | — | — |
| Carbon dioxide SCF-$CO_2$ | 1 | 2 | 3 | 2 | 5 | 5 | 5 | 1 |

TABLE 1-continued

|  | Examples | | | | | | | |
|---|---|---|---|---|---|---|---|---|
|  | 1 | 2 | 3 | 4 | 5 | 6 | 7 | 8 |
| Azodicarbonamide ADCA | — | — | — | — | — | — | — | — |
| Butane gas | — | — | — | — | — | — | — | — |
| Surface appearances | A | A | A | A | A | A | A | A |
| Expansion ratio | 2.0 | 3.5 | 6.0 | 3.0 | 12.5 | 12.5 | 12.5 | 2.0 |
| Flexibility | A- | A- | A | A- | A- | A- | B | A |
| Heat resistance | A | A | A | A | A | A | A | A |
| Average cell number × $10^3/cm^3$ | 6.0 | 7.2 | 8.0 | 9.5 | 12.0 | 12.0 | 12.0 | 6.5 |
| Average cell diameter ($\mu$m) | 100 | 80 | 60 | 50 | 80 | 80 | 80 | 50 |
| Cell uniformity | A | A | A | A | A | A | A | A |
| Stability of quality | A | A | A | A | A | A | A | A |

TPU-1: Pellethane 2103-90AEL
TPU-2: Pellethane 2355-80AE
TPU-3: Pellethane 2363-80AE
TPU-4: Pellethane 2102-80A

TABLE 2

|  | Comparative Examples | | | | | | | |
|---|---|---|---|---|---|---|---|---|
|  | 1 | 2 | 3 | 4 | 5 | 6 | 7 | 8 |
| TPU-1 | 100 | 100 | 100 | — | — | — | — | — |
| TPU-2 | — | — | — | 100 | — | — | 100 | 100 |
| TPU-3 | — | — | — | — | 100 | — | — | — |
| TPU-4 | — | — | — | — | — | 100 | — | — |
| Carbon dioxide SCF-$CO_2$ | 0.05 | 35 | — | — | — | — | — | 0.05 |
| Azodicarbonamide ADCA | — | — | 2 | 2 | — | — | — | — |
| Butane gas | — | — | — | — | 3 | 3 | 3 | — |
| Surface appearances | A | C | B | B | A | A | A | A |
| Expansion ratio | 1.2 | 3.0 | 2.0 | 2.2 | 5.0 | 5.0 | 5.0 | 1.1 |
| Flexibility | B- | B | B | B | A | B- | B- | B- |
| Heat resistance | A | A | A | A | C | A | A | A |
| Average cell number × $10^3/cm^3$ | 0.3 | 0.2 | 0.15 | 0.15 | 0.2 | 0.2 | 0.2 | 0.25 |
| Average cell diameter ($\mu$m) | 200 | 500 | 300 | 300 | 500 | 500 | 500 | 150 |
| Cell uniformity | C | C | C | C | B | A- | A- | B |
| Stability of quality | A | C | C | C | B | A- | A- | B |

TPU-1: Pellethane 2103-90AEL
TPU-2: Pellethane 2355-80AE
TPU-3: Pellethane 2363-80AE
TPU-4: Pellethane 2102-80A

TABLE 3

|  | Examples | | | | | | | |
|---|---|---|---|---|---|---|---|---|
|  | 9 | 10 | 11 | 12 | 13 | 14 | 15 | 16 |
| TPU-1 | 100 | 100 | 100 | 100 | 80 | 80 | 75 | 90 |
| MAH-modified PP | — | — | — | — | 20 | 20 | 25 | 10 |
| Additive-1 | 0.02 | 0.02 | 0.02 | 0.02 | 0.02 | 0.02 | 0.02 | 0.02 |

TABLE 3-continued

|  | Examples | | | | | | | |
| --- | --- | --- | --- | --- | --- | --- | --- | --- |
|  | 9 | 10 | 11 | 12 | 13 | 14 | 15 | 16 |
| Carbon dioxide SCF-$CO_2$ | 1 | 1 | 1 | 1 | 2 | 3 | 0.5 | 0.5 |
| Foaming nucleating agent | — | 0.1 | 0.3 | 0.5 | 0.5 | 0.5 | — | — |
| Chemical foaming agent ADCA | — | — | — | — | — | — | 0.5 | 0.5 |
| Surface appearances, including evaluation of cell roughness | A | A | A | A | A | A- | B | B |
| Expansion ratio | 2.0 | 2.5 | 2.7 | 2.8 | 2.9 | 3.0 | 1.8 | 1.7 |
| Flexibility | A- | A- | A | A | A- | A- | B | B |
| Heat resistance | A | A | A | A | A | A | A- | A- |
| Average cell number × $10^3$/$cm^3$ | 5.1 | 7.5 | 8.0 | 13.0 | 9.5 | 11.0 | 3.5 | 2.0 |
| Average cell diameter ($\mu$m) | 90 | 80 | 60 | 50 | 80 | 70 | 150 | 180 |
| Cell uniformity | A | A | A | A | A | A- | C | C |
| Bulk density (g/$cm^3$) | 0.56 | 0.45 | 0.42 | 0.39 | 0.38 | 0.38 | 0.63 | 0.67 |
| Stability of quality | A | A | A | A | A | A | A- | A- |

TPU-1: Pellethane 2103-90AEL
MAH-modified PP: Polypropylene modified with maleic anhydride (Admer GF551; Mitsui Chemicals, Inc.)
Additive-1: Lubricant; Ethylene bisstearyl amide (EBA)
Foaming nucleating agent: Sodium bicarbonate/citric acid (Hydrocerol; Nippon Boehringer Ingelheim Co., Ltd.)

TABLE 4

|  | Examples | | | | | | | |
| --- | --- | --- | --- | --- | --- | --- | --- | --- |
|  | 9 | 10 | 11 | 12 | 13 | 14 | 15 | 16 |
| Production conditions Resin melting temperature T1 | 235 | 235 | 235 | 235 | 235 | 230 | 230 | 230 |
| Resin melting temperature T2 | 210 | 210 | 210 | 210 | 200 | 200 | 200 | 200 |
| Resin melting temperature T3 | 200 | 190 | 180 | 175 | 175 | 180 | 180 | 180 |
| Surface appearances, including evaluation of cell roughness | A | A | A | A | A | A | B | B |
| Elongation set % A1 | 24 | 25 | 23 | 23 | 22 | 25 | 27 | 30 |
| Heat of crystallization J/g | 7.4 | 8.5 | 11.0 | 12.5 | 8.3 | 8.4 | 7.5 | 6.9 |
| $\Delta$Tm ° C. A2 | 15 | 20 | 17 | 15 | 10 | 13 | 8 | 9 |
| Td 5% ° C. A3 | 284 | 290 | 295 | 296 | 294 | 286 | 270 | 260 |
| Chloroform-insolubles A4 | 97 | 96 | 95 | 94 | 95 | 93 | 93 | 92 |
| Allophanate group A5 (mmol/g) | 0.03 | 0.03 | 0.03 | 0.07 | 0.10 | 0.07 | 0.055 | 0.040 |

TABLE 4-continued

|  | Examples | | | | | | | |
|---|---|---|---|---|---|---|---|---|
|  | 9 | 10 | 11 | 12 | 13 | 14 | 15 | 16 |
| MFR A6 G/10 min, 190° C. | 1.60 | 2.03 | 8.88 | 5.59 | 10.0 | 11.2 | 9.1 | 9.7 |

T1: Temperature for the gas dissolving step in the extruder
T2: Temperature for the cooling step in the extruder
T3: Temperature of resin at die outlet
A1: Determined in accordance with JIS K-6301-3 at an elongation ratio of 200%
A2: Difference between melting point (Tm1) of the foam and melting point (Tm2) of the composition not foamed, determined by DSC
A3: Temperature at which weight decreased by 5%, determined by TG-DTA
A4: Gel fraction (chloroform-insolubles), determined by the in-house MTCI method
A5: Determined by the amine decomposition method
A6: Determined in accordance with JIS K-7210 with the foam test piece cut to 0.3 mm or less Industrial Applicability As discussed above, the present invention can produce the urethane-based thermoplastic elastomer foam of stable quality over a range from low foamed product to highly foamed product by adding a given quantity of carbon dioxide in the molten urethane-based thermoplastic elastomer quantitatively and stably. It can also produce the foam excellent in flexibility, thermal insulation and surface appearances. It is also excellent in safety, because of use of carbon dioxide in place of the common foaming agent of fluorochlorohydrocarbon or butane, thus causing no air pollution or destruction of the ozone layer.

What is claimed is:

1. A urethane-based thermoplastic elastomer foam obtained by dynamically heat treating a thermoplastic polyurethane resin-containing composition containing a thermoplastic polyurethane resin in an amount of 20% by weight or more, wherein the foam has
    an average cell diameter of 0.1 to 1,000 $\mu$m,
    an average cell number of $10^3$ to $10^{16}/cm^3$,
    an elongation set of 1 to 100%,
    a bulk density of 0.03 to 1.10 $g/cm^3$, and wherein
    the melting point of the urethane-based thermoplastic elastomer foam ($T_{m1}$) and non-foamed resin ($T_{m2}$) as determined by DSC satisfy the formula (1):

$$T_{m1}-T_{m2} \geq 5° C. \quad (1).$$

2. The urethane-based thermoplastic elastomer foam as claimed in claim 1, wherein chloroform-insolubles are present in the urethane-based thermoplastic elastomer foam in an amount of at least 10% by wt.

3. The urethane-based thermoplastic elastomer foam as claimed in claim 1, wherein a residue after chloroform extraction of the urethane-based thermoplastic elastomer composition foam is present in an amount of 20% by weight or more, and 5% weight loss of the residue after chloroform extraction occurs at a temperature of 180° C. or higher.

4. A method for producing a urethane-based thermoplastic elastomer foam comprising the steps of:
    (1) admixing 0.1 to 30 parts by weight of carbon dioxide (B) with 100 parts by weight of a urethane-based thermoplastic elastomer composition (A) in a molten state together with a dynamic heat treatment, wherein said urethane-based thermoplastic elastomer composition (A) comprises a urethane-based thermoplastic elastomer (A-1) and another thermoplastic elastomer (A-2) present in a weight ratio of (A-1)/(A-2) of from 20/80 to 99/1 by weight, to form a molten urethane-based thermoplastic elastomer composition (C) which comprises a mixture of the urethane-based thermoplastic elastomer composition (A) and the carbon dioxide (B); and
    (2) lowering the temperature of said molten urethane-based thermoplastic elastomer composition (C).

5. A method for producing a urethane-based thermoplastic elastomer foam comprising the steps of:
    (1) admixing 0.1 to 30 parts by weight of carbon dioxide (B) with 100 parts by weight of a urethane-based thermoplastic elastomer composition (A) in a molten state together with a dynamic heat treatment to form a molten urethane-based thermoplastic elastomer composition (C) which comprises a mixture of the urethane-based thermoplastic elastomer composition (A) and the carbon dioxide (B);
    (2) cooling said molten urethane-based thermoplastic elastomer composition (C),
    (3) exposing said cooled composition (C) to reduced pressure sufficient to produce cell nuclei in the molten urethane-based thermoplastic elastomer composition (C), and
    (4) then foaming said composition (C) while controlling an expansion ratio.

6. The method for producing a urethane-based thermoplastic elastomer foam as claimed in claim 4 or 5, wherein said urethane-based thermoplastic elastomer composition (A) has a melt flow rate as determined in accordance with ASTM D-1238-65T at 0.5 to 50 g/10 minutes.

7. The method for producing a urethane-based thermoplastic elastomer foam as claimed in claim 4 or 5, wherein said urethane-based thermoplastic elastomer composition (A) comprises the urethane-based thermoplastic elastomer (A-1) and another thermoplastic elastomer (A-2) having a melt flow rate determined in accordance with ASTM D-1238-65T at 0.01 g/10 minutes or more and less than 50 g/10 minutes,
    said thermoplastic elastomer (A-2) being present in an amount of 5 to 60 parts by weight per 100 parts by weight of said urethane-based thermoplastic elastomer composition (A).

8. The method for producing a urethane-based thermoplastic elastomer foam as claimed in claim 4 or 5, wherein the temperature of said molten urethane-based thermoplastic elastomer composition in said step (1) is in the range of 100 to 240° C. and the temperature of said molten urethane-based thermoplastic elastomer composition in said step (2) is 10 to 100° C. lower than that in step (1).

9. The method for producing a urethane-based thermoplastic elastomer foam as claimed in claim 4 or 5, wherein the amount of the carbon dioxide (B) added is in the range of 0.1 to 20 parts by weight per 100 parts by weight of said urethane-based thermoplastic elastomer composition (A).

10. The method for producing a urethane-based thermoplastic elastomer foam as claimed in claim 4 or 5,
wherein said carbon dioxide (B) is a supercritical carbon dioxide (B-1).

11. The method for producing a urethane-based thermoplastic elastomer foam as claimed in claim 4 or 5, wherein said carbon dioxide is added in a liquified form,
and said carbon dioxide is kept at a constant pressure from the critical pressure of carbon dioxide of 7.4 Mpa to 40 Mpa, the carbon dioxide is charged by a pump, and the carbon dioxide charged from the pump is heated to a critical temperature of carbon dioxide of 31° C. or higher, to be a supercritical carbon dioxide,
and said supercritical carbon dioxide is added to said urethane-based thermoplastic elastomer composition in a molten state.

12. The method for producing a urethane-based thermoplastic elastomer foam as claimed in claim 4 or 5, wherein said urethane-based thermoplastic elastomer (A-1) is selected from the group consisting of an amorphous polymer, semi-crystalline polymer, liquid-crystalline polymer, thermoplastic polymer and elastomer, each containing at least one bond selected from the group consisting of urethane bond, urea bond, thiourethane bond and thiourea bond.

13. A urethane-based thermoplastic elastomer foam, having
an average cell diameter of 0.1 to 1,000 μm,
an average cell number of $10^3$ to $10^{16}$/cm$^3$,
an elongation set of 1 to 100%,
a bulk density of 0.03 to 1.10 g/cm$^3$, and wherein
the melting point of the urethane-based thermoplastic elastomer foam ($T_{m1}$) and non-foamed resin ($T_{m2}$) as determined by DSC satisfy the formula (1):

$$T_{m1} - T_{m2} \geq 5° \text{ C.} \tag{1}$$

and being obtained through the steps of dissolving 0.1 to 30 parts by weight of carbon dioxide (B) in 100 parts by weight of a urethane-based thermoplastic elastomer composition (A) of a molten state together with a dynamic heat treatment, wherein said urethane-based thermoplastic elastomer composition (A) comprises a urethane-based thermoplastic elastomer (A-1) and another thermoplastic elastomer (A-2) in a weight ratio of (A-1)/(A-2) of from 20/80 to 99/1 by weight to form a molten urethane-based thermoplastic elastomer composition (C) which comprises a mixture of the urethane-based thermoplastic elastomer composition (A) and the carbon dioxide (B); and cooling said molten urethane-based thermoplastic elastomer composition (C).

14. A urethane-based thermoplastic elastomer foam, having
an average cell diameter of 0.1 to 1,000 μm,
an average cell number of $10^3$ to $10^{16}$/cm$^3$,
an elongation set of 1 to 100%,
a bulk density of 0.03 to 1.10 g/cm$^3$, and wherein
the melting point of the urethane-based thermoplastic elastomer foam ($T_{m1}$) and non-foamed resin ($T_{m2}$) as determined by DSC satisfy the formula (1):

$$T_{m1} - T_{m2} \geq 5° \text{ C.} \tag{1}$$

and being obtained through the steps of dissolving 0.1 to 30 parts by weight of carbon dioxide (B) in 100 parts by weight of a urethane-based thermoplastic elastomer composition (A) in a molten state together with a dynamic heat treatment to form a molten urethane-based thermoplastic elastomer composition (C) which comprises a mixture of urethane-based thermoplastic elastomer composition (A) and the carbon dioxide (B);
cooling said molten urethane-based thermoplastic elastomer composition (C); and
exposing said molten urethane-based thermoplastic elastomer composition (C) to a lower pressure than that of the cooling step to produce cell nuclei in said molten urethane-based thermoplastic elastomer composition (C), and controlling an expansion ratio while foaming.

15. A laminate including the urethane-based thermoplastic elastomer foam as claimed in any one of claim 1, 13 and 14.

16. A molded article comprising the urethane-base thermoplastic elastomer foam as claimed in any one of claim 1, 13 and 14.

* * * * *